(12) United States Patent
Tadano

(10) Patent No.: US 9,104,845 B2
(45) Date of Patent: Aug. 11, 2015

(54) DIGITAL CONTENT MANAGEMENT SYSTEM, VERIFICATION DEVICE, PROGRAMS THEREOF, AND DATA PROCESSING METHOD

(75) Inventor: Kumiko Tadano, Tokyo (JP)

(73) Assignee: NEC CORPORATION, Tokyo (JP)

(*) Notice: Subject to any disclaimer, the term of this patent is extended or adjusted under 35 U.S.C. 154(b) by 291 days.

(21) Appl. No.: 13/638,337

(22) PCT Filed: Mar. 18, 2011

(86) PCT No.: PCT/JP2011/001608
§ 371 (c)(1),
(2), (4) Date: Sep. 28, 2012

(87) PCT Pub. No.: WO2011/121928
PCT Pub. Date: Oct. 6, 2011

(65) Prior Publication Data
US 2013/0022230 A1    Jan. 24, 2013

(30) Foreign Application Priority Data
Mar. 31, 2010   (JP) .................... 2010-083716

(51) Int. Cl.
*G06K 9/00*   (2006.01)
*G06K 9/18*   (2006.01)
*G06F 21/16*   (2013.01)

(52) U.S. Cl.
CPC ...................... *G06F 21/16* (2013.01)

(58) Field of Classification Search
None
See application file for complete search history.

(56) References Cited

U.S. PATENT DOCUMENTS

| 6,389,151 | B1 * | 5/2002 | Carr et al. ............... 382/100 |
| 6,782,115 | B2 * | 8/2004 | Decker et al. ........... 382/100 |
| 7,031,491 | B1 * | 4/2006 | Donescu et al. ......... 382/100 |
| 7,184,572 | B2 * | 2/2007 | Rhoads et al. .......... 382/100 |
| 7,269,735 | B2 * | 9/2007 | Raley et al. ............. 713/176 |

(Continued)

FOREIGN PATENT DOCUMENTS

| JP | 2001-069454 A | 3/2001 |
| JP | 2008-109510 A | 5/2008 |
| WO | 2005/060256 A1 | 6/2005 |

OTHER PUBLICATIONS

Tadano et al. :"Digital Watermarking of Virtual Machine Images" Advances in Digital Forensics IV, IFIPAICT 337, pp. 257-288 (2010).*

(Continued)

*Primary Examiner* — Chan Park
*Assistant Examiner* — Mia M Thomas
(74) *Attorney, Agent, or Firm* — Sughrue Mion, PLLC

(57) ABSTRACT

A digital content management system (1) includes: a digital watermark embedding device (100) which generates embedding information uniquely determined from identification information for tracking use, and embeds a digital watermark into a digital content to be managed, based on the thus-generated embedding information; a digital watermark detection device (200) which generates the tracking information uniquely determined from identification information for verification use, and detects the digital watermark in a digital content to be verified based on the thus-generated tracking information; and a verification device (300) which verifies the identification information for verification use supposed to be used for verifying the digital content to be verified in which the digital watermark was detected.

16 Claims, 15 Drawing Sheets

(56) References Cited

U.S. PATENT DOCUMENTS

| | | | |
|---|---|---|---|
| 7,802,312 B2* | 9/2010 | You et al. | 726/31 |
| 7,959,065 B2* | 6/2011 | Rosenblatt et al. | 235/375 |
| 8,023,694 B2* | 9/2011 | Rhoads et al. | 382/100 |
| 8,135,166 B2* | 3/2012 | Rhoads et al. | 382/100 |
| 8,144,368 B2* | 3/2012 | Rodriguez et al. | 358/3.28 |
| 2002/0027612 A1* | 3/2002 | Brill et al. | 348/473 |
| 2002/0061120 A1* | 5/2002 | Carr et al. | 382/100 |
| 2002/0122564 A1* | 9/2002 | Rhoads et al. | 382/100 |
| 2003/0044043 A1* | 3/2003 | Kaneda | 382/100 |
| 2003/0118211 A1* | 6/2003 | Eguchi et al. | 382/100 |
| 2004/0071311 A1* | 4/2004 | Choi et al. | 382/100 |
| 2005/0021980 A1* | 1/2005 | Kanai | 713/182 |
| 2005/0027996 A1* | 2/2005 | Wittkoter | 713/193 |
| 2005/0036651 A1* | 2/2005 | Wen | 382/100 |
| 2005/0129270 A1* | 6/2005 | Prakash | 382/100 |
| 2005/0289081 A1* | 12/2005 | Sporny | 705/64 |
| 2006/0115110 A1* | 6/2006 | Rodriguez et al. | 382/100 |
| 2006/0157559 A1* | 7/2006 | Levy et al. | 235/380 |
| 2006/0239504 A1* | 10/2006 | Najarian | 382/100 |
| 2007/0292034 A1* | 12/2007 | Tabankin | 382/232 |
| 2008/0010459 A1* | 1/2008 | Knoll et al. | 713/176 |
| 2008/0089554 A1* | 4/2008 | Tabankin et al. | 382/100 |
| 2008/0313084 A1* | 12/2008 | Socolofsky | 705/52 |
| 2009/0141931 A1* | 6/2009 | Yadid-Pecht et al. | 382/100 |
| 2009/0202071 A1* | 8/2009 | Kato | 380/201 |
| 2012/0140919 A1* | 6/2012 | Tadano | 380/28 |
| 2013/0024698 A1* | 1/2013 | Tadano | 713/176 |
| 2013/0275113 A1* | 10/2013 | Tadano | 703/21 |
| 2013/0338799 A1* | 12/2013 | Tadano | 700/12 |

OTHER PUBLICATIONS

Hweehwa Pang, et al., "SteFS: A Steganographic File System", Proceedings of the 19th International Conference on Data Engineering (ICDE' 03), IEEE, Mar. 8, 2003, pp. 657-667.

Kumiko Tadano, "Digital Watermarking of Virtual Machine Images", Advances in Digital Forensics VI, Springer, Jan. 1, 2010, pp. 257-268.

Tsukasa Ono, "Denshi Sukasi to Kontentsu Hogo (Digital Watermark and Content Protection)", Published by Ohmsha, Ltd., Feb. 2001, pp. 147-151, 59-60 and 97-108.

Knut Eckstein, et al., "Data Hiding in Journaling File Systems", 2005 Digital Forensic Research Workshop (DFRWS), 2005, pp. 1-8.

* cited by examiner

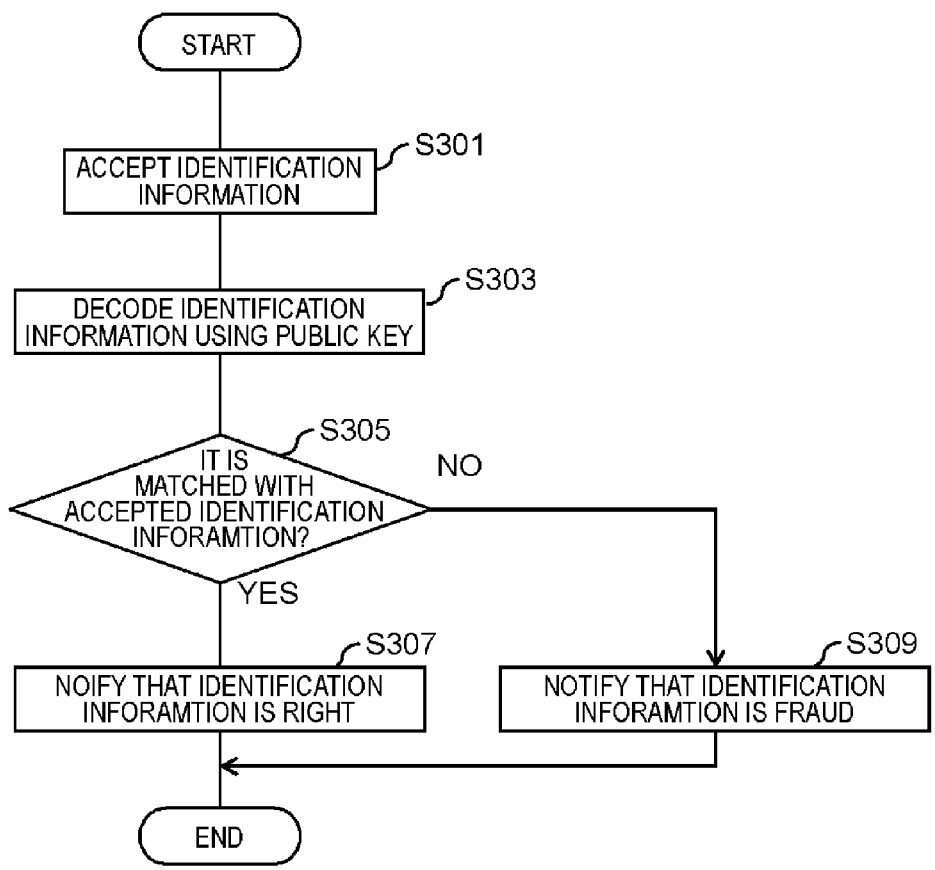

DIGITAL CONTENT MANAGEMENT SYSTEM, VERIFICATION DEVICE, PROGRAMS THEREOF, AND DATA PROCESSING METHOD

CROSS REFERENCE TO RELATED APPLICATIONS

This application is a National Stage of International Application No. PCT/JP2011/001608 filed Mar. 18, 2011, claiming priority based on Japanese Patent Application No. 2010-083716, filed Mar. 31, 2010, the contents of all of which are incorporated herein by reference in their entirety.

TECHNICAL FIELD

The present invention relates to a digital content management system, a verification device, a program thereof, and a data processing method, and in particular to a digital content management system which manages a digital content including a file set, a verification device, a program thereof, and a data processing method.

BACKGROUND ART

In recent years, thin client server has been attracting public attention from the viewpoint of enhancing security and desktop portability. On the thin client server based on virtual machines (VM) (VirtualPCCenter and so on) in corporate data centers and so forth, paid software such as Microsoft Office (registered trademark) is supposed to run.

In this sort of environment, it is anticipated that a VM image is duplicated by a malicious user or system administrator, and leaked to a large indefinite number of people. This is because digital contents are readily copied or falsified, and may readily be spread broadly through networks, while being assisted by dissemination of file conversion techniques (such as P2P (Peer to Peer)).

It is therefore necessary to trace the leakage, if the digital contents such as VM image including the paid software were illegally leaked. In recent years, techniques for tracing the digital contents have been developed (see Non-Patent Documents 1 and 2, for example).

Embedding of digital watermark into the digital content is one possible technique of tracing the digital content. The digital watermark is a technique of embedding identification information or the like into the digital content, without largely degrading the quality.

Even if the digital content illegally leaks as a result of breakage of tamper-proofing technique or cryptographic technique as a block against license violation, the leaked digital content is traceable by using the digital watermark.

In recent years, techniques of tracing the digital content have been developed (see Non-Patent Document 1, for example). For digital contents relevant to pictures and sounds, a large number of digital watermark techniques have been developed. According to Non-Patent Document 1, those making use of frequency range or picture replacement are exemplified for picture contents, and those making use of echo or phase modification are exemplified for sound contents.

A known technique of embedding a digital watermark into an picture content is described in Patent Document 1. Moreover, a method of embedding a file name of a content into the content as a part of ID information is described in Patent Document 2.

RELATED DOCUMENT

Patent Document

[Patent Document 1] Japanese Laid-Open Patent Publication No. 2001-069454
[Patent Document 2] Japanese Laid-Open Patent Publication No. 2008-109510

Non-Patent Document

[Non-Patent Document 1] Tsukasa Ono, "Denshi Sukashi to Kontentsu Hogo (Digital Watermark and Content Protection)", Published by Ohmsha, Ltd., February 2001, pp. 147-151, 59-60, and 97-108
[Non-Patent Document 2] Knut Eckstein et al., and another one, "Data Hiding in Journaling File Systems", (U.S.A.), 2005 Digital Forensic Research Workshop (DFRWS), 2005, pp. 1-8

DISCLOSURE OF THE INVENTION

Problems to be Solved by the Invention

The techniques described in the documents listed in the above, however, enable embedding of the digital watermark by the methods highly specialized for properties of picture and sound, and are therefore not adoptable to digital contents having general file sets such as virtual machine.

On the other hand, a data hiding technique, such as described in Non-Patent Document 2, is known as a technique of embedding information into a file system having a general file set.

Possible destinations of embedding of information include (a) to (g) listed below:

(a) a portion of a journaling file system not subjected to consistency check;
(b) a region referred by no file, but remained in reserve state due to modification of an inode;
(c) embedding into a content having a specific file format (comment line in text file, for example);
(d) a region hidden by a device driver;
(e) extended file attribute (alternate data stream, for example);
(f) a free space on a partition table; and
(g) an unused portion of the last data unit of a file (Slack Space).

The data hiding according to the techniques described in Non-Patent Documents described in the above were, however, applicable only when kernel, OS (operating system), file system, file format and so forth satisfy specific conditions.

For example, the destination (a) is not applicable, for example, to a legacy system which does not support the journaling file system. The destination (b) is limited to the case where OS is Linux, and is not adoptable to Windows (registered trademark). The destination (c) is not adoptable if there is no file with the specific extension. The destination (d) is not adoptable if the version of kernel has been updated, since the device driver generally depends on the kernel of a specific version. The destination (e) is not adoptable to a system which does not support the extended file attribute. As described in the above, all of the conventional data hiding techniques were lack of versatility.

Another known problem was that, even if illegality were reported as a result of tracing of a digital content by means of an embedded identification information, and even if the report of the verification result itself were false, it was no longer easy to confirm the truth.

It is therefore an object of the present invention to provide a digital content management system, a verification device, a program thereof, and a data processing method, capable of increasing believability of verification of digital content, which has been a problem in the prior art.

Means for Solving the Problems

According to the present invention, there is provided a digital content management system which includes:

a digital watermark embedding unit which generates embedding information uniquely determined from identification information for tracking use, and embeds a digital watermark into a digital content to be managed, based on the thus-generated embedding information;

a digital watermark detection unit which generates tracking information uniquely determined from identification information for verification use, and detects the digital watermark in a digital content to be verified based on the thus-generated tracking information; and a verification unit which verifies the identification information for verification use supposed to be used for verifying the digital content to be verified in which the digital watermark was detected.

According to the present invention, there is also provided a verification device which includes a verification unit which verifies an identification information for verification use supposed to be used for verifying a digital content to be verified, in which a digital watermark was detected by a digital watermark detection device which generates tracking information uniquely determined from the identification information for verification use, and detects the digital watermark in the digital content to be verified based on the thus-generated tracking information.

According to the present invention, there is also provided a computer program making a computer implement a verification device, the program being configured to make a computer execute a procedure of verifying identification information for verification use, which is supposed to be used for verifying a digital content to be verified in which a digital watermark was detected by a digital watermark detection device, the digital watermark detection device being configured to generate tracking information uniquely determined from identification information for verification use, and to detect the digital watermark in the digital content to be verified, based on the thus-generated tracking information.

According to the present invention, there is also provided a data processing method for a verification device, the verification device verifies identification information for verification use, which is supposed to be used for verifying a digital content to be verified in which a digital watermark was detected by a digital watermark detection device, the digital watermark detection device being configured to generate tracking information uniquely determined from identification information for verification use, and to detect the digital watermark in the digital content to be verified, based on the thus-generated tracking information.

Note that arbitrary combinations of the above-described constituents, and all exchanges made in the expression of the present invention made among method, device, system, recording medium, computer program and so forth are valid as exemplary embodiments of the present invention.

Note that each of various constituents of the present invention may not always necessarily be configured as an independent entity, and instead a plurality of constituents may configure a single component, a single constituents may be configured by a plurality of components, a certain constituent may be a part of other constituent, and a part of certain constituent may be shared with a part of other constituent.

While the data processing method and the computer program of the present invention are described by enumerating a plurality of procedures in sequence, the order of description is not interpreted to limit the order of implementation of the plurality of procedures. Accordingly, the data processing method and the computer program of the present invention may be implemented in a modified order of the plurality of procedures, without adversely affecting the spirit thereof.

The plurality of procedures in the data processing method and the computer program are not always necessarily implemented at different points of time. For example, one procedure may occur in another procedure, and one procedure and another procedure may overlap partially or entirely.

Effects of the Invention

According to the present invention, there is provided a digital content management system, a verification device, a program thereof, and a data processing method, capable of tracing general digital contents which include file sets, and capable of improving believability of verification of the digital contents, irrespective of the file system, OS, version of kernel, file format and so forth.

BRIEF DESCRIPTION OF THE DRAWINGS

The above and other objects, features and advantages of the present invention will be more apparent from the following description of certain preferred exemplary embodiments taken in conjunction with the accompanying drawings listed below.

FIG. 15 is a flow chart illustrating an exemplary operation of an identification information verification device of this exemplary embodiment.

DESCRIPTION OF THE EXEMPLARY EMBODIMENTS

Figure 1:
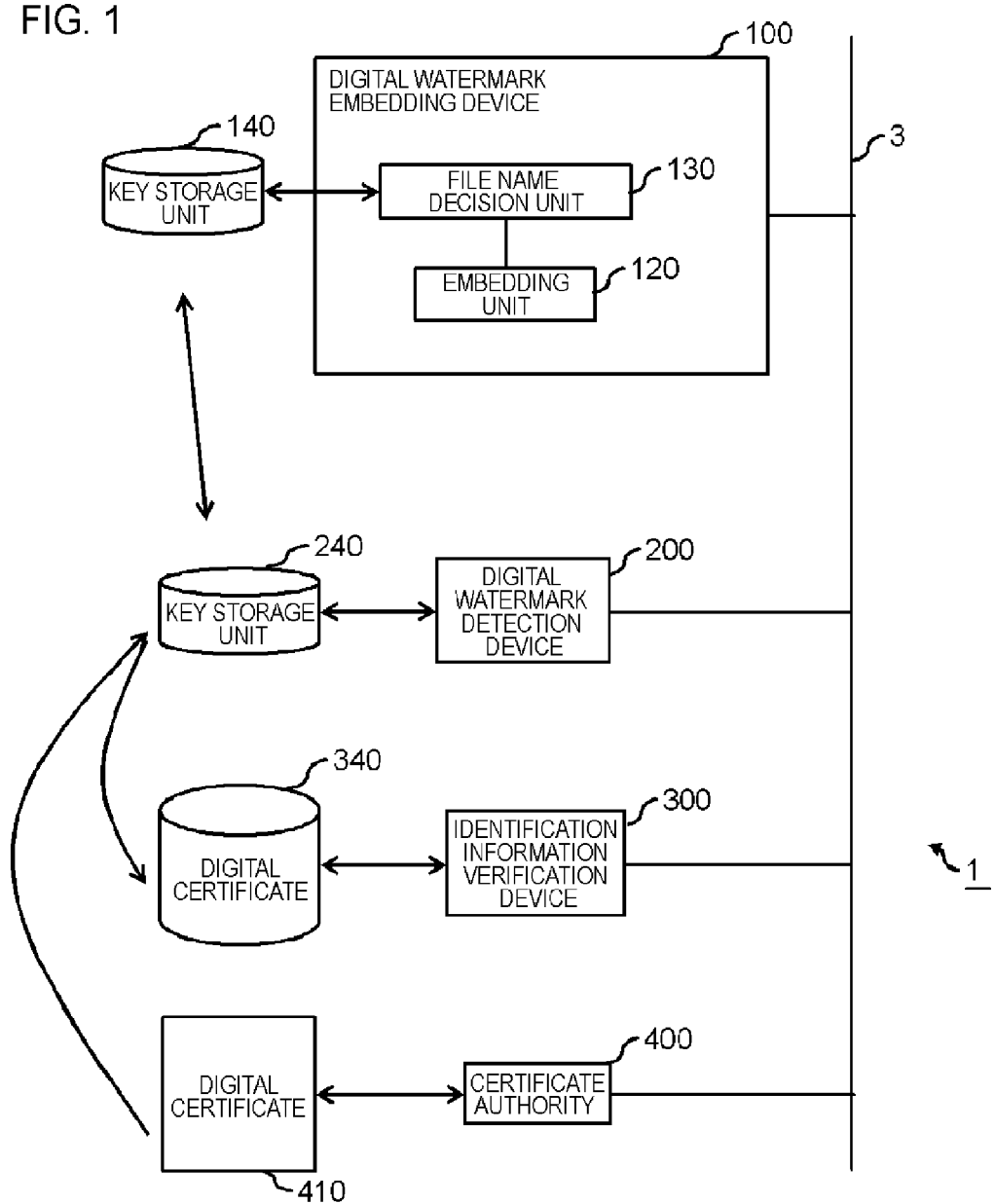
FIG. 1 is a functional block diagram illustrating a configuration of a digital content management system according to an exemplary embodiment of the present invention.

Exemplary embodiments of the present invention will be explained below, referring to the attached drawings. Note that all similar constituents in all drawings will be given similar reference numerals, and will not always be explained.

First Exemplary Embodiment

FIG. 1 is a functional block diagram illustrating a configuration of a digital content management system 1 according to an exemplary embodiment of the present invention.

A digital content management system 1 of this exemplary embodiment embeds a digital watermark into a digital content to be managed, so as to enable tracing of the digital content to be managed, by detecting the digital watermark, having been embedded for tracing, in the digital content to be verified, when the digital content is anticipated to be illegally copied. The digital content management system 1 of the present invention is applicable, for example, to copyright management for digital contents.

The digital content management system 1 of this exemplary embodiment allows the third party to verify identification information for verification use, which was supposed to be used for verifying a digital content to be verified in which a digital watermark was detected.

The digital content management system 1 of this exemplary embodiment uses a name of file, as the digital watermark to be embedded into the digital content. The digital watermark information herein is not embedded into the contents of file, and in other words, the digital watermark information is not written into the file, but the digital watermark per se is no other than the name of file. The digital watermark may, therefore, be embedded into any type of digital content so long as it is on a system on which the file can exist, irrespective of OS (Linux, Windows, etc.), file system [NTFS (NT File System), FAT32 (File Allocation Table 32), EXT2, EXT3, etc.], hardware [CD-ROM (Compact Disk Read Only Memory), DVD-ROM (Digital Versatile Disk Read Only Memory), hard disk] and so forth.

In this exemplary embodiment, the file name is defined as an absolute path which includes a file and a directory (folder). In this exemplary embodiment, digital content to be managed contains a file set, such as virtual machine image file, or a set of application programs typically recorded in a ZIP archive file, or in a medium such as CD or DVD. Even if the digital content seems not to contain the file at a glance, such that the file is hidden by a data hiding technique so as not to be discriminative at a glance from random data, or such that the file is compressed to be a part of other data, the present invention is applicable by making the file accessible, typically by unlocking the hidden state when necessary, or by extracting the compressed data.

In addition, as described in the above, the digital content management system 1 of this exemplary embodiment may be used in combination with the various techniques of data hiding described in Non-Patent Document 2. Accordingly, strength of the digital watermark may be improved by combining a plurality of techniques.

The digital content management system 1 of this exemplary embodiment has a digital watermark embedding device 100 which generates embedding information uniquely determined from identification information for tracking use, and embeds a digital watermark into a digital content to be managed, based on the thus-generated embedding information; a digital watermark detection device 200 which generates tracking information uniquely determined from identification information for verification use which contains identification information same with that of the identification information for tracking use, used when the digital watermark was embedded, and detects the digital watermark in the digital content to be verified, based on the thus-generated tracking information; and an identification information verification device 300 which verifies the identification information for verification use supposed to be used for verifying the digital content to be verified in which the digital watermark was detected.

Examples of the identification information for tracking use or the identification information for verification use may include identification information of user or owner of VM (administrator, name of company, or name of department, for example); identification information of VM image; information of date and hour; and arbitrary combinations of them. The identification information for tracking use is used when the digital watermark is embedded, and the identification information for verification use is used when the digital watermark is detected. In other words, the identification information for tracking use is used when the digital watermark is embedded, and is used also in the verification, as the identification information for verification use which contains identification information same as that contained in the identification information for tracking use, used when the digital watermark was embedded.

In the digital content management system 1 of this exemplary embodiment, the digital watermark embedding device 100 generates the files having the file names uniquely determined based on the identification information for tracking use, and embeds the files as the digital watermark into a digital content to be managed, and the digital watermark detection device 200 generates file names uniquely determined based on the identification information for verification use which contains identification information same as that contained in the identification information for tracking use, used when the digital watermark was embedded, and detects the files having the thus-generated file names in the digital content to be verified.

In addition, in the digital content management system 1, the digital watermark embedding device 100 may embed, as the digital watermark, the file having the thus-generated file names at predetermined locations in the digital content to be managed, and the digital watermark detection device 200 may detect the files having the thus-generated file names which reside at the predetermined locations in the digital content to be verified.

The predetermined locations herein may preliminarily be determined as common locations, both by the digital watermark embedding device 100 and the digital watermark detection device 200. The common locations may reside, for example, in a folder having a predetermined folder name, or a specific location such as the root directory. Alternatively, for the case where a plurality of folders are arranged according to a predetermined rule, the predetermined locations may be placed in some n-th folder among the folders sorted by their names in alphabetical order or in reverse alphabetical order. While the embedding locations of the digital watermark are varied depending on the digital contents in this exemplary embodiment as described later, the locations are not limited thereto, and may be preliminarily determined locations as described in the above.

In the digital content management system 1, the digital watermark embedding device 100 specifies the embedding locations uniquely determined based on the identification information for tracking use, and embeds, as the digital watermark, the files having the thus-generated file names at the thus-specified embedding locations. The digital watermark detection device 200 then uses the identification information for verification use which contains identification information same as that contained in the identification information for tracking use which was used when the digital watermark was embedded, to thereby specify search locations uniquely determined based on the identification information, according to a procedure similarly to that adopted by the digital watermark embedding device 100, and can therefore detect the files having the thus-generated file names which reside at the thus-specified search locations in the digital content to be verified.

The thus-specified embedding locations and the thus-specified search locations herein correspond to a partial character string contained in the file names uniquely determined based on the identification information for tracking use.

More specifically, the digital content management system 1 of this exemplary embodiment has the digital watermark embedding device 100, the digital watermark detection device 200, the identification information verification device 300, and a certificate authority 400. The digital watermark embedding device 100, the digital watermark detection device 200, the identification information verification device 300, and the certificate authority 400 are connected to each other through a network 3.

In this exemplary embodiment, the digital watermark embedding device 100 and the digital watermark detection device 200 use a common secret key in the process of encryption of the identification information, as described later. An administrator, for example, of the digital watermark embedding device 100 or the digital watermark detection device 200 preliminarily creates the secret key, and a public key which is the pair to the secret key, and store them in a key storage unit 140 or a key storage unit 240. The secret key and the public key may be created by a general method which will not be detailed since it is not an essential part of the present invention. The thus-created public key is submitted to the certificate authority 400, together with owner information (name, e-mail address, purpose of use, etc.) of the public key, for application for issuance of a digital certificate. Application for the digital certificate may be made by either administrator of the digital watermark embedding device 100 and the digital watermark detection device 200.

The certificate authority 400 confirms that the owner information of the applicant is genuine, and then issues the digital certificate 410 to the applicant, by attaching an electronic signature to the public key and the owner information. The digital certificate 410 contains the public key, the owner information, and the electronic signature issued by the certificate authority 400. As described later, the identification information verification device 300 verifies validity of the identification information submitted by the administrator of the digital watermark detection device 200 while assuming that it was identified when the administrator of the digital watermark detection device 200 detected any illegal digital content, using the public key which is the pair to the secret key of the administrator of the digital watermark embedding device 100 or the digital watermark detection device 200. The fact that the public key used by the identification information verification device 300 is truly that of the administrator of the digital watermark embedding device 100 or the digital watermark detection device 200, may be certified by the digital certificate 410 issued by the certificate authority 400. In other words, the public key is now tied with the owner such as administrator by the digital certificate 410.

While the digital certificate 410 issued by the certificate authority 400 in this exemplary embodiment may be stored in the key storage unit 140 of the digital watermark embedding device 100 or in the key storage unit 240 of the digital watermark detection device 200, the place of storage is not limited thereto, so that the digital certificate 410 may be stored anywhere accessible by the verifier when necessary, without limitation.

The digital watermark embedding device 100, the digital watermark detection device 200, the identification information verification device 300 and the certificate authority 400 illustrated in FIG. 1 were configured to be connected through the network 3, but not limited thereto. For example, at least two of the digital watermark embedding device 100, the digital watermark detection device 200 and the identification information verification device 300 may be configured as a single device, or may exist on the same host. The certificate authority 400 does not always necessarily exist on the same network 3, and may alternatively be configured so as to accept the application from the digital watermark embedding device 100 or the digital watermark detection device 200 through e-mail or a recording medium, and so as to issue and send the digital certificate 410. The identification information verification device 300 receives, as described later, the digital certificate 410 from the digital watermark detection device 200, and stores it into a digital certificate storage unit (denoted as "digital certificate" in the drawing) 340.

The administrator of the digital watermark embedding device 100 and the digital watermark detection device 200 may be the same person or may be different persons. The administrator of the identification information verification device 300 is preferably a third party who belongs to an organization different from that the administrator(s) of the digital watermark embedding device 100 and the digital watermark detection device 200 belong to. The administrator of the identification information verification device 300 is a person different at least from the administrator of the digital watermark detection device 200.

The digital watermark embedding device 100 determines one or more file names which are used later as the digital watermark to be embedded into the digital content to be managed. The digital watermark detection device 200 detects the digital watermark, by confirming whether one or more file names which were used as the digital watermark reside in the digital content to be verified or not. In other words, the digital watermark detection device 200 detects the file names embedded as the digital watermark into the digital content, and detects the digital watermark by extracting the identification information contained in the file names.

In this exemplary embodiment, the digital watermark embedding device 100 may generate a plurality of files having the file names, and may embed them respectively into the digital content to be managed. The digital watermark detection device 200 may detect at least one of the plurality of files having the plurality of file names which were used as the digital watermark, in the digital content to be verified.

The digital content to be verified may be accepted, for example, by reading them out from other devices through the network 3, or by reading them out from various media including DVD, CD, Blu-ray disc, hard disk and various types of memory card using a reading device (not illustrated).

In this exemplary embodiment, the digital content management system 1 it may further include a digital content-to-be-managed detection unit (not illustrated) which detects, as the digital content to be managed, the digital content to be verified in which the file names, which are used as the digital watermark, were detected by the digital watermark detection device 200.

In this exemplary embodiment, the digital watermark embedding device 100 may assume a plurality of digital contents as targets to be managed, and may embed the digital watermark into each of the digital contents to be managed.

The digital watermark embedding device 100, and the digital watermark detection device 200 may be implemented, for example, by a server computer or a personal computer which has an unillustrated CPU (Central Processing Unit), a memory, a hard disk and a communication device, and is connected to input devices such as a keyboard and a mouse, and also to output devices such as a display and a printer, or by an equivalent equipment. The individual functions of the individual units described below will be implemented, when the CPU reads a program stored in the hard disk into the memory, and executes the program. Note that the drawings referred to below will not show configurations which are not essential to the present invention.

The individual constituents of the digital content management system 1 are implemented by arbitrary combinations of hardware and software, mainly contributed by a CPU of an arbitrary computer, a memory, a program loaded onto the memory for the purpose of implementing the constituents illustrated in the drawing, a storage unit such as a hard disk for storing the program, and a network connection interface. It will be readily understood by those skilled in the art that there are many modifications in the method of implementation and the devices implementing. The drawings referred to hereinbelow will illustrate configurations on the basis of functional blocks, rather than on the basis of hardware.

<Digital Watermark Embedding Device>

First, the digital watermark embedding device 100 of the digital content management system 1 of the present invention will be explained.

As illustrated in FIG. 1, in the digital content management system 1 of this exemplary embodiment, the digital watermark embedding device 100 has a file name decision unit 130 and an embedding unit 120.

In the digital watermark embedding device 100, the file name decision unit 130 generates the file name to be used as the digital watermark. In further details, one or more file names which are used later as the digital watermark while being embedded into the digital content to be managed are determined. The digital content to be managed may be accepted by, for example, reading of other device through the network 3, or reading of various media such as DVD, CD, Blu-ray disc, hard disk and various types of memory card using reading devices (not illustrated).

The embedding unit 120 embeds the digital watermark, generated by the file name decision unit 130, into the digital content to be managed. In other words, the embedding unit 120 generates the files, having the names determined by the file name decision unit 130, in the digital content.

Figure 2:
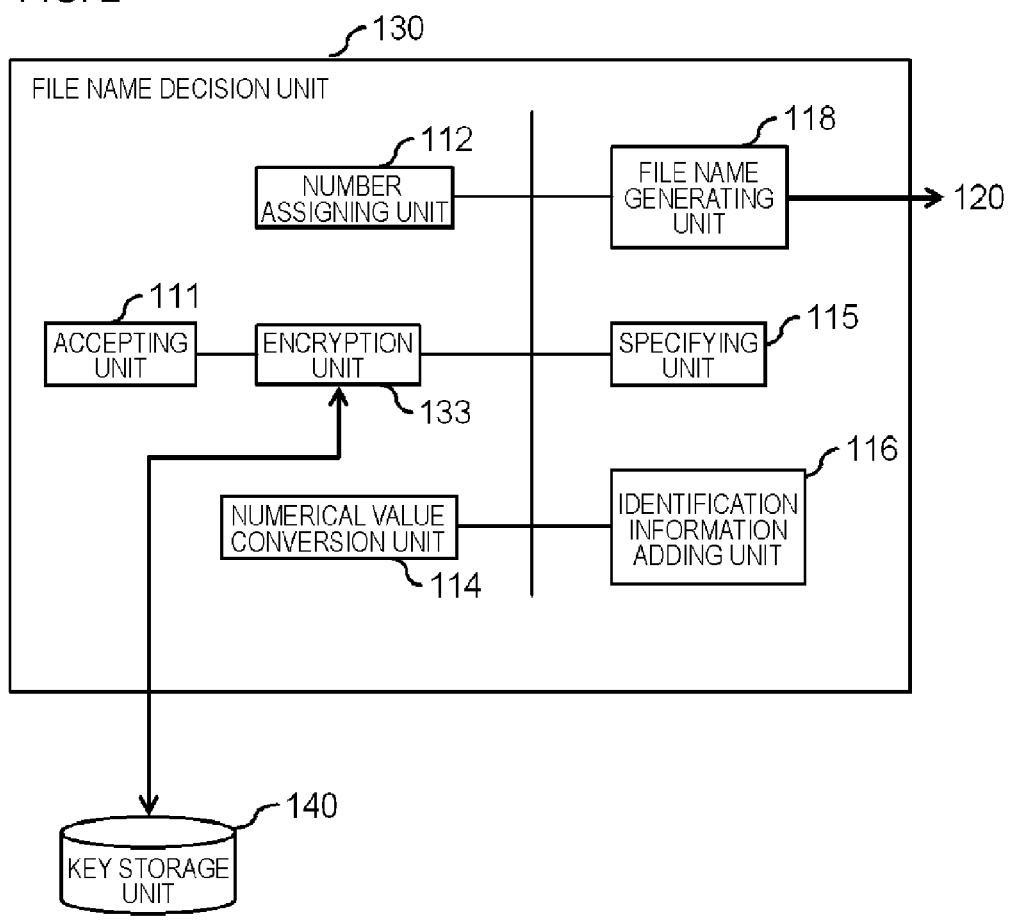
FIG. 2 is a functional block diagram illustrating a configuration of a file name decision unit of the digital watermark embedding device of this exemplary embodiment.

FIG. 2 is a functional block diagram illustrating a configuration of the file name decision unit 130 of this exemplary embodiment.

In the digital content management system 1 of this exemplary embodiment, the digital watermark embedding device 100 has an identification information-for-tracking-use accepting unit (accepting unit 111) which accepts the identification information for tracking use; an assigning unit (number assigning unit 112) which detects the file names of the files, or the file names containing the directory names in the digital content to be managed, and assigns content layout identification information to each of the thus-detected file names; an embedding location specifying unit (specifying unit 115) which specifies embedding locations uniquely determined based on the thus-accepted identification information for tracking use, by collating them with the content layout identification information; and an file name-to-be-embedded generation unit (identification information adding unit 116, file name generating unit 118) which generates file names to be embedded by adding information uniquely determined based on the thus-accepted identification information for tracking use, to the file names of the thus-specified embedding locations. The digital watermark embedding device 100 generates the files having the file names to be embedded generated by the file name generating unit 118, and embeds the thus-generated files, as the digital watermark, into the digital content to be managed, based on the content layout identification information.

More specifically, as illustrated in FIG. 2, the file name decision unit 130 in this exemplary embodiment has the accepting unit 111, the number assigning unit 112, an encryption unit 133, a numerical value conversion unit 114, the specifying unit 115, the identification information adding unit 116, and the file name generating unit 118.

The accepting unit 111 may accept the above-described identification information for tracking use, which is entered to an ID entry field on an ID (identifier) designation screen, by an operator using an operating unit (not illustrated) at the digital watermark embedding device 100, or at any other terminal connected through a network or the like to the digital watermark embedding device 100. The identification information may be a character string, or may be a numerical value. Alternatively, for the case where the digital content to be managed is a VM image as described previously, an ID which is automatically or manually assigned to the VM image may be accepted as the identification information for tracking use. Still alternatively, date-and-hour information having the digital watermark embedded therein may be generated as the identification information for tracking use automatically in the digital content to be managed, and may be accepted. Still alternatively, the identification information indicating a manufacturer of the digital content to be managed, a name of company or a name of department to which the user belongs may be determined in advance, or may be selected from a plurality of identification information, and may be accepted. These information may be combined. For example, the above-described ID designated by the operator may be accepted after being added with the date-and-hour information.

The number assigning unit 112 detects file names of files, or file names containing directory names in the digital content to be managed, and assigns a different number to each of the thus-detected file names. More specifically, the number assigning unit 112 assigns numbers to absolute paths containing all files and directories in the digital content, and determines unique numbers corresponding to the respective file names and directory names. For example, a possible method may be such as assigning numbers according to the descending alphabetical order of the file names and directory names. Alternatively, the names of the absolute paths including all files and directories are processed by hash function, and the obtained hash values may be sorted in an ascending or descending order, and then the numbers may be assigned to the respective hash values.

While this exemplary embodiment was configured to assign, as content layout identification information, numbers (numerical values) to all absolute paths in sequence, the exemplary embodiment is not limited thereto. The numerical values may follow an order given by a predetermined rule, typically may be different numerical values derived from a predetermined function, and typically may be only odd numbers. In short, it suffices that unique numerical values corresponded to the names of the individual files and directories are assigned according to a predetermined rule. Alternatively, ordering based on the Dewey Order system may be adopted to information typically to a tree structure of file system, by which arrangement of the contents indicated by the absolute paths containing all files and directories are identifiable. Alternatively, the content layout identification information may be generated by combining numerical values with alphabets and so forth.

The numbers (content layout identification information) are not always necessarily be assigned to all absolute paths. The numbers (content layout identification information) may be assigned to a part of the absolute paths according to a predetermined rule.

In this exemplary embodiment, the administrator of the digital watermark embedding device 100 or the digital watermark detection device 200, for example, preliminarily generates a pair of a secret key and a public key, and store them respectively into the key storage unit 140 and the key storage unit 240. The administrator of the digital watermark detection device 200, for example, applies to the certificate authority 400 for a digital certificate of the public key, acquires the digital certificate 410 issued by the certificate authority 400, and stores it into the key storage unit 240. The digital watermark detection device 200 may receive the digital certificate 410 from the certificate authority 400 through the network 3, or may receive the digital certificate 410 which was attached to an e-mail or the like, and sent from the certificate authority 400. Alternatively, the digital certificate 410 may be read out from a recording medium, and may be stored into the key storage unit 240. The digital certificate 410 may be sent to the identification information verification device 300 at an arbitrary timing without special limitation, but at least before verification of the identification information which was supposed to be identified by the digital watermark detection device 200. For example, it may be sent together with the identification information when the identification information is sent from the digital watermark detection device 200 to the identification information verification device 300.

The same will also apply to delivery of the keys between the digital watermark embedding device 100 and the digital watermark detection device 200, wherein the keys may be sent or received through the network 3, or may be delivered using e-mail or recording media. The delivery of the keys between the digital watermark embedding device 100 and the digital watermark detection device 200, and application for the digital certificate 410 may be made at arbitrary timing without special limitation, but at least before the digital content is verified by the digital watermark detection device 200.

The encryption unit 133 encrypts the identification information for tracking use, using the secret key stored in the key storage unit 140. Known public key encryption systems include RSA (Rivest Shamir Adleman). Technique of encryption is, however, not limited thereto. The numerical value conversion unit 114 converts the encrypted identification information for tracking use, into numerical values. Known techniques of character encoding include UTF-8 (8-bit UCS (Universal multi-octet Character Set) Transformation Format).

The specifying unit 115 collates the embedding locations which are uniquely determined based on the identification information for tracking use accepted by the accepting unit 111, with the content layout identification information, and specifies them. In this exemplary embodiment, the embedding locations may be specified by numerical values of the identification information for tracking use which were obtained by conversion by the numerical value conversion unit 114. For example, if the identification information was converted into a numerical value of "2", the number assigning unit 112 collates it with the numerical value assigned to the absolute path, and specifies the name of file and directory of the second absolute path as the heading character string of the embedding location.

If the numerical value output from the numerical value conversion unit 114 is larger than the number assigned by the number assigning unit 112, the numerical value is divided by the total number of files, and the numerical value of the resultant remainder may be used by the specifying unit 115 to specify the embedding location. As an alternative to this method, a numerical value output from the numerical value conversion unit 114 may be used as the numerical value, by predetermined digit(s). For example, when a numerical value of "112356" was obtained, it may be divided into three numeral values of "11", "23" and "56", or the four lower digits may be divided into four numerical values of "2", "3", "5" and "6", or the two upper digits may be used, or every third digit may be used. It suffices that the numerical value output from the numerical value conversion unit 114 is processed by a procedure having a predetermined rule, to thereby specify the embedding locations.

For an exemplary case where the numerical values indicating a plurality of embedding locations were obtained, a process of generating and embedding the file names which are used later as the digital watermark, and a process of assigning numbers by the number assigning unit 112 are repeated using respective plurality of numerical values, according to an order with some rule, which is an ascending order in this case. When the absolute paths containing all files or directories in the digital content are numbered, upon completion of embedding of all digital watermarks at respective locations indicated by the plurality of numerical values by repeating these processes, the digital watermarks are necessarily embedded at the locations indicated by the plurality of numerical values.

Alternatively, a plurality of digital watermarks may be embedded based on the numbers originally assigned to the absolute paths containing the files or directories in the digital content, without re-numbering.

One possible method without re-numbering will be as follows:

First, numerical values indicating a plurality of embedding locations are arranged according to an order with a predetermined rule, typically in ascending order in this case.

Next, the thus-arranged numerical values, where Ni represents the i-th numerical value, are sequentially replaced with numbers (Ni−(i−1)) (i represents a natural number). For example, the first numerical value is left unchanged, the second numerical value is replaced with a value subtracted by one, and the third numerical value is replaced with a value subtracted by two.

Next, the thus-replaced individual numerical values are embedded, according to the numbers originally assigned to the files or directories. There may be a possible case where some replaced values are same (for example, if the second numerical value N2 is 2, the third numerical value N3 is 3, and the fourth numerical value N4 is 4, all numerical values after the replacement will be 1). In this case, a possible order of embedding may be such that the i-th numerical value is followed by the (i+1)-th numerical values in sequence.

As described in the above, re-numbering is avoidable, by predicting a disorder in the arrangement of the files possibly resulted from embedding of the files to be used as the digital watermark, and by shifting the numerical values which indicate the embedding locations.

The identification information adding unit 116 directs the file name generating unit 118 to add the numerical values generated by the numerical value conversion unit 114, or additional information corresponded to the numerical values, to the file names. A possible example of the additional information corresponded to the numerical values relates to a preliminarily determined correlation describing that 1 denotes "a", 2 denotes "b", 3 denotes "c", and so on. If the numerical value generated by the numerical value conversion unit 114 is 1, then "a" is added as the additional information.

The file name generating unit 118 generates the file names (absolute paths), by adding the additional information identified by the identification information adding unit 116, at the predetermined locations in the heading character strings of the names (absolute paths) of the files or the directory-containing files which reside at the embedding locations specified by the specifying unit 115. The file names generated by the file name generating unit 118 are passed to the embedding unit 120. In this exemplary embodiment, the additional information is added next to the end of the heading character strings of the file names specified by the specifying unit 115. Besides the addition of the additional information, other possible methods include a method of generating and adding a random character string, and a method of adding extensions to the file names. For the case where the numbers were assigned according to a rule other than alphabetical order, it is not always necessary to add the additional information next to the end of the heading character strings, and instead the additional information may be embedded at predetermined locations in the heading character strings, so long as they do not fail to fall on the embedding locations specified by the specifying unit 115.

For the case where the numbers were assigned by the number assigning unit 112 according to a rule other than alphabetical order, the file name generating unit 118 does not always necessarily generate the heading character strings as the file names to be used as the digital watermark, and instead the file names may be generated so as to be corresponded to the file names specified by the specifying unit 115, in compliance with a certain rule.

Figure 3:
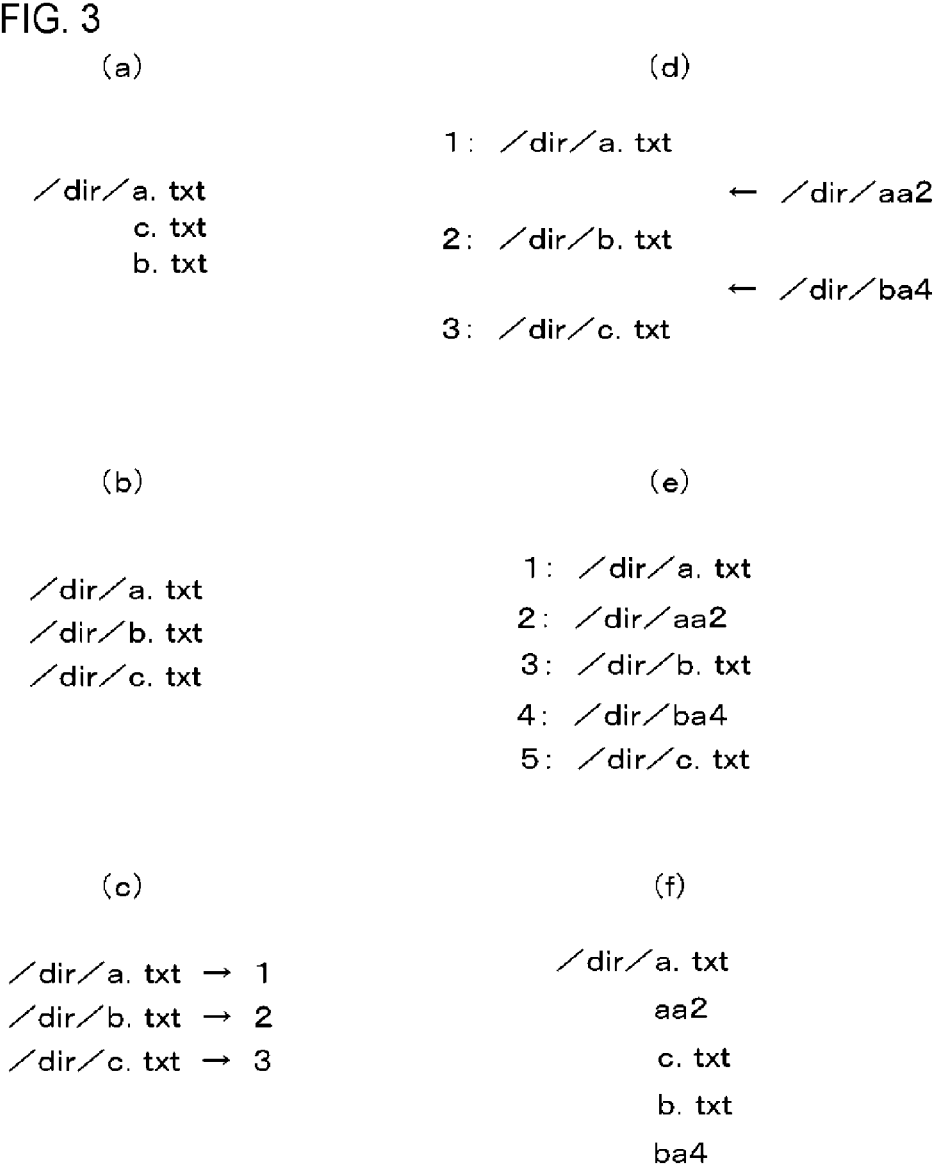
FIG. 3 is a drawing explaining processes which proceed in the file name decision unit of the digital watermark embedding device of this exemplary embodiment.

FIG. 3 illustrates a specific example. As seen in FIG. 3(a), assuming now that files named "a.txt", "c.txt", and "b.txt" reside in a directory named "/dir/" in the digital content to be managed. When the paths of three files "/dir/a.txt", "/dir/b.txt" and "/dir/c.txt" are re-arranged in alphabetical order, and added with numerical values as seen in FIG. 3(b), the number assigning unit 112 numbers "/dir/a.txt" as 1, "/dir/b.txt" as 2, and "/dir/c.txt" as 3, as illustrated in FIG. 3(c).

On the other hand, assuming now that the numerical values generated by the numerical value conversion unit 114 were 2 and 4, as illustrated in FIG. 3(d), the files to be used as the digital watermark are respectively embedded between the second "/dir/b.txt" and the preceding "/dir/a.txt", and between the third "/dir/c.txt" and the preceding "/dir/b.txt".

The file name generating unit 118 then generates new files having file names whose heading character strings respectively start with "/dir/a" and "/dir/b". The identification information adding unit 116 directs the file name generating unit 118 to add the additional information, corresponded to the numerical values 2 and 4 generated by the numerical value conversion unit 114, to the ends of the file names. For example, simply 2 and 4 may be added to the ends of the file names. The resultant file names "/dir/aa2.txt" and "/dir/ba2.txt", generated by the file name generating unit 118, correspond to the digital watermark. As a consequence, as illustrated in FIG. 3(e), the alphabetical order of the files will be such that "/dir/a.txt" comes to the first place, "/dir/aa2" to the second, "/dir/b.txt" to the third, "/dir/ba4" to the fourth, and "/dir/c.txt" to the fifth.

Alternatively, the file names of the files, which are used later as the digital watermark, may be generated by further generating a character strings which come next to the end of the heading character strings, and by combining the both. In this case, a possible method may be such as generating a random character string (the aforementioned "/dir/aa2" is converted to "/dir/aaa2", for example), or such as adding an extension to the file name (the aforementioned "/dir/aa2" is converted to "/dir/aa2.txt", for example).

As a consequence, the files in the directory "/dir/" will be arranged as illustrated in FIG. 3(f).

<Digital Watermark Detection Device>

Next, the digital watermark detection device 200 in the digital content management system 1 of this exemplary embodiment will be explained.

Figure 4:
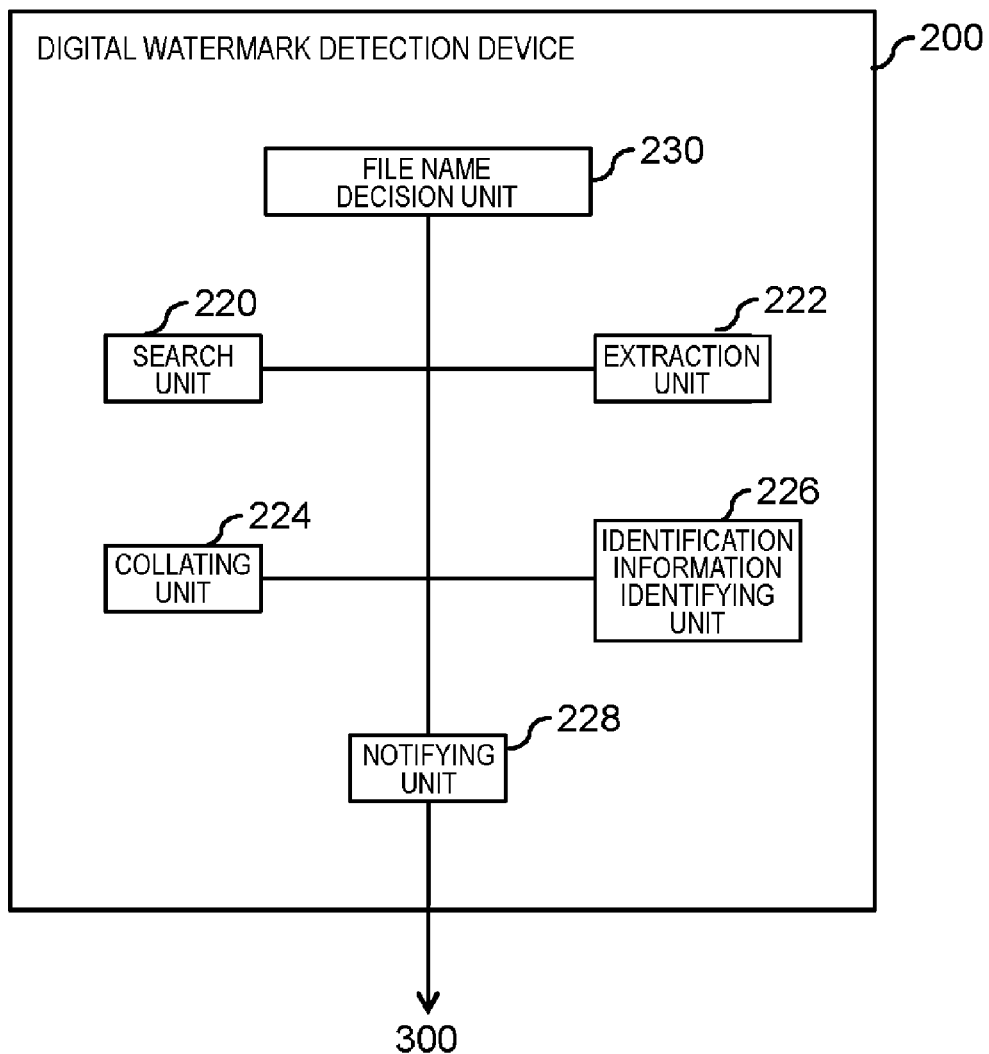
FIG. 4 is a functional block diagram illustrating a configuration of a digital watermark detection device in the digital content management system of this exemplary embodiment.
Figure 5:
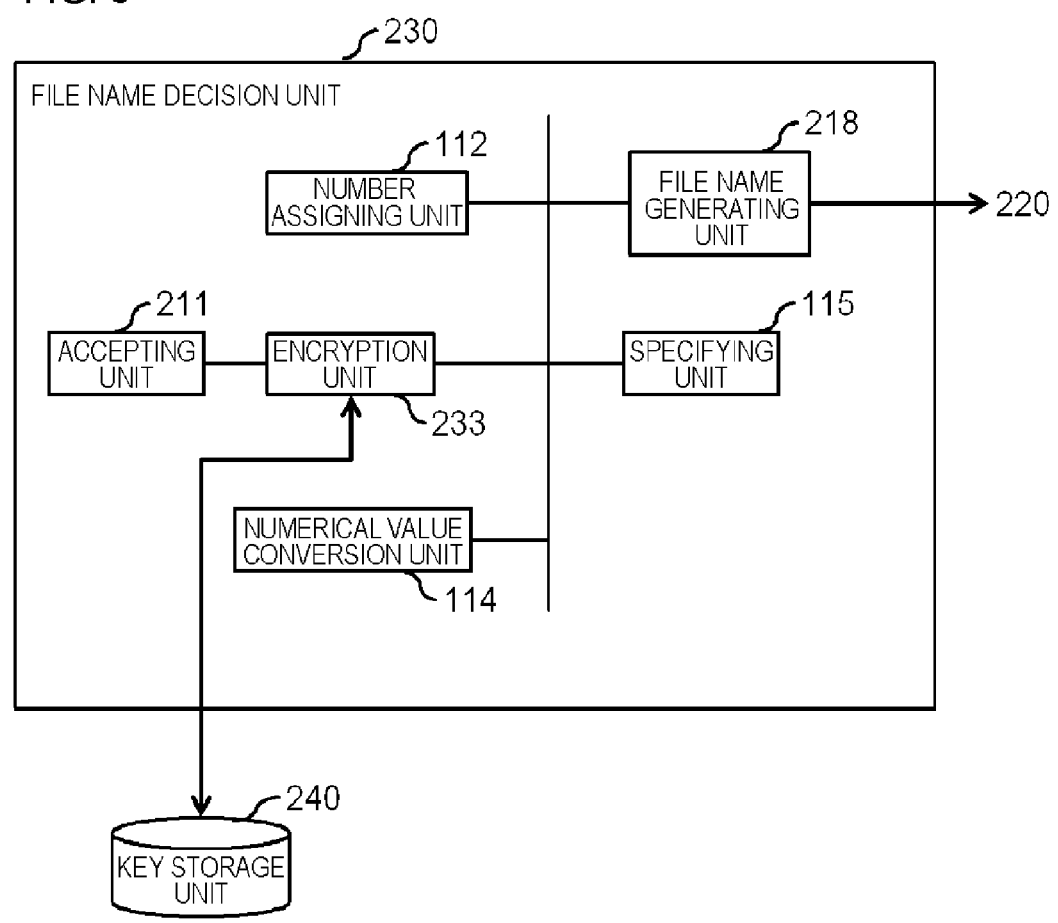
FIG. 5 is a functional block diagram illustrating a configuration of the file name decision unit of the digital watermark detection device of this exemplary embodiment.

FIG. 4 is a functional block diagram illustrating a configuration of the digital watermark detection device 200 in the digital content management system 1 according to the exemplary embodiment of the present invention. FIG. 5 is a functional block diagram illustrating a configuration of the file name decision unit 230 in the digital watermark detection device 200 of this exemplary embodiment.

In the digital content management system 1 of this exemplary embodiment illustrated in FIG. 5, digital watermark detection device 200 has an identification information-for-verification-use accepting unit (an accepting unit 211) which accepts the identification information for verification use which contains the identification information same as that contained in the identification information for tracking use which was used when the digital watermark was embedded; the assigning unit (the number assigning unit 112) which detects the file names of the files, or the file names containing the directory names, in the digital content to be verified, and assigns the content layout identification information to each of the thus-detected file names; the search location specifying unit (the specifying unit 115) which specifies the search locations uniquely determined based the accepted identification information for verification use, by collating them with the content layout identification information, so as to specify them; and a search file name generating unit (a file name generating unit 218) which generates at least part of the file names at the thus-specified search locations as the search file names. The digital watermark detection device 200 detects the files having at least the part of the search file names generated by the search file name generating unit (file name generating unit 218), in the digital content to be verified.

In the digital content management system 1 of this exemplary embodiment illustrated in FIG. 5, the digital watermark detection device 200 further has an extraction unit 222 which extracts information from the predetermined locations in the thus-detected file names of the files; a collating unit 224 which collates information extracted by the extraction unit 222, with information uniquely determined based on the identification information for verification use accepted by the identification information-for-verification-use accepting unit (accepting unit 211); and an identification information identifying unit 226 which identifies the identification information for verification use, as the identification information for tracking use, which were used when the digital watermark was embedded by the digital watermark embedding device 100, when the collating unit 224 showed agreement between the extracted information, and the information uniquely determined based on the identification information for verification use accepted by the identification information-for-verification-use accepting unit (the accepting unit 211).

More specifically, as illustrated in FIG. 4, the digital watermark detection device 200 of this exemplary embodiment has the file name decision unit 230, a search unit 220, the extraction unit 222, the collating unit 224, the identification information identifying unit 226, and a notifying unit 228.

The file name decision unit 230 has, as illustrated in FIG. 5, the number assigning unit 112, the numerical value conversion unit 114 and the specifying unit 115, which are similar to those in the file name decision unit 130 illustrated in FIG. 2, and additionally has the accepting unit 211, the file name generating unit 218, and an encryption unit 233.

In this exemplary embodiment, the number assigning unit 112 of the digital watermark detection device 200 detects the file names of the files or the file names containing the directory names, in the digital content to be verified, and assigns a different number to each of the thus-detected file names. Configuration and processes thereof are similar to those of the number assigning unit 112 in the digital watermark embedding device 100, except for the digital content to be targeted.

In the process of verifying the digital content by the digital watermark detection device 200, the accepting unit 211 in the file name decision unit 230 accepts identification information assumed as a target of verification, as the identification information for verification use. The identification information for verification use which is used herein is the same with the identification information used as the identification information for tracking use, when the digital watermark was embedded by the digital watermark embedding device 100. As has been described in the above, the identification information for verification use may be, for example, identification information of the users or owner of VM (for example, administrator, name of company, name of department, or the like), identification information of a VM image, date-and-hour information, and arbitrary combinations of them. The identification information for verification use may be identified based on estimation made to some degree, or may be identified using all or part of every possible identification information, that is the user IDs of all employees of a company, or user IDs of employees in a specific department, for example.

The accepting unit 211 in the digital watermark detection device 200 prompts the user, typically on an unillustrated identification information identifying screen, to enter or select the identification information, and accepts the thus-entered or selected identification information as the identification information for verification use. Alternatively, identification information generated by the computer program, or identification information stored in a table may be used. The accepting unit 211 may accept a plurality of identification information for verification use, and may process them in sequence.

Alternatively, for the case where user identification is necessary before using the digital content, since the user is asked to enter the user name and the password typically on a login screen (not illustrated), so that the accepting unit 211 may accept the user name as the identification information for verification use of the present invention.

Alternatively, the digital watermark detection device 200 of this exemplary embodiment may be provided to a terminal through which the digital content is accessed, so as to implement verification when the user accesses the digital content. The verification of the digital contents in progress may be notified to the user, or do not have to be notified. In other words, digital watermark detection process by the digital watermark detection device 200 may be conducted in the background, without notifying the user.

The encryption unit 233 encrypts the identification information for verification use accepted by the accepting unit 211, using the secret key stored in the key storage unit 240. Encryption herein proceeds similarly as implemented by the above-described file name decision unit 130 in the digital watermark embedding device 100. The secret key stored in the key storage unit 240 is same as that used when the digital watermark was embedded into the digital content by the encryption unit 133 in the digital watermark embedding device 100. Similarly as implemented by the above-described file name decision unit 130 in the digital watermark embedding device 100, the numerical value conversion unit 114 converts the thus-encrypted identification information for verification use into numerical values, and thereby the uniquely determined information may be obtained.

The file name generating unit 218 in the file name decision unit 230 generates at least a part of the search file names, using the heading character strings of the file names at the search locations specified by the specifying unit 115. The file names generated by the file name generating unit 218 are passed to the search unit 220.

As described in the above, in the present invention, since the digital watermark detection device 200 repeats the processes similar to those conducted for the digital content to be managed by the digital watermark embedding device 100, so that the file name decision unit 230 is now capable of generating the file names embedded in the digital content so as to be used as the digital watermark.

Referring now back to FIG. 4, the search unit 220 searches the files having at least part of the file names generated by the file name decision unit 230, in the digital content to be verified. The extraction unit 222 extracts, from the file names of the files searched by the search unit 220, the additional information added by the identification information adding unit 116 in the file name decision unit 130 of the digital watermark embedding device 100. In this exemplary embodiment, the additional information is attached to the end of the file names.

The collating unit 224 collates the additional information extracted by the extraction unit 222, with the information uniquely determined based on the identification information for verification use accepted by the accepting unit 211.

The identification information identifying unit 226 identifies the identification information for verification use, when agreement was found between the information extracted by the collating unit 224, and the information uniquely determined based on the identification information for verification use accepted by the accepting unit 211. The identification information identifying unit 226 identifies that the identification information for verification use which was accepted by the accepting unit 211 when agreement of information was detected by the collating unit 224, is the identification information for tracking use which was used when the digital watermark was embedded into the digital content to be verified.

Upon identification of the identification information for tracking use by the identification information identifying unit 226, the notifying unit 228 notifies the user that the digital watermark was detected in the digital content to be verified, together with the thus-identified identification information for tracking use. The digital watermark detection device 200 is now capable of detecting the digital content, in which the digital watermark was detected, as the digital content to be managed.

Upon failure of identification of the identification information for tracking use by the identification information identifying unit 226, the notifying unit 228 then notifies the user that the digital watermark was not detected in the digital content to be verified. When the files generated by the file name decision unit 230 were detected in the digital content to be verified by search unit 220, and when the information collated by the collating unit 224 did not agree, the notifying unit 228 notifies the user that the digital watermark was detected in the digital content to be verified, but the identification information for tracking use was not identified.

Possible methods of notification to the user by the notifying unit 228 include image display or command line display on a display unit (not illustrated) of the digital watermark detection device 200, or display unit of any other terminal connected to the digital watermark detection device 200 through a network or the like, recording into a log file, notification by mail or messenger, and printing of a report using a printer (not illustrated) connected to the digital watermark detection device 200.

<Identification Information Verification Device>

In this exemplary embodiment, the administrator of the digital watermark detection device 200 notifies the administrator of the identification information verification device 300, about the thus-identified identification information for tracking use. Alternatively, the identification information for tracking use supposed to be identified by the identification information identifying unit 226 may be sent from the digital watermark detection device 200 to the identification information verification device 300 through the network 3. Still alternatively, the identification information for tracking use supposed to be identified may be posted to the identification information verification device 300, by email, recording media (USB memory, various types of memory card, CD-ROM, DVD-ROM, hard disk, or the like). In this process, it would be possible that the administrator of the digital watermark detection device 200 merely reports that the identification information for tracking use was identified, but the administrator may conduct falsified report. The identification information verification device 300, therefore, verifies validity of the identification information for tracking use reported by the administrator of the digital watermark detection device 200.

The digital watermark detection device 200 sends the information uniquely determined based on the identification information for verification use, together with the identification information for tracking use, to the identification information verification device 300. The identification information verification device 300 verifies validity of the identification information for tracking use supposed to be identified, using the information uniquely determined based on the identification information for verification use and the identification information for tracking use sent from the digital watermark detection device 200.

Figure 14:
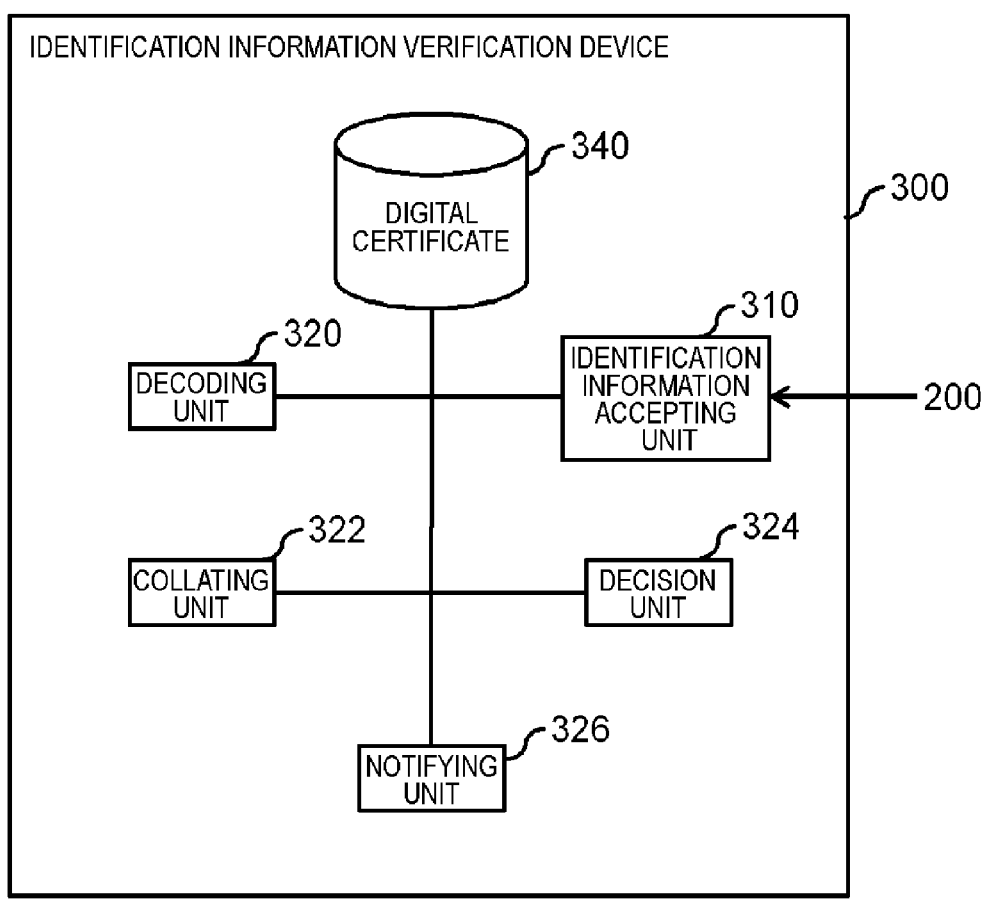
FIG. 14 is a block diagram illustrating a configuration of an identification information verification device of this exemplary embodiment.

FIG. 14 is a functional block diagram illustrating a configuration of the identification information verification device 300 of this exemplary embodiment.

In the digital content management system 1 of this exemplary embodiment, the digital watermark embedding device 100 generates the embedding information uniquely determined from the identification information for tracking use, by encryption using the secret key, and embeds the digital watermark into the digital content to be managed, based on the thus-generated embedding information. On the other hand, the digital watermark detection device 200 generates the tracking information uniquely determined from the identification information for verification use, by encryption using the secret key same as that used in the digital watermark embedding device 100, and detects the digital watermark in the digital content to be verified, based on the thus-generated tracking information. The identification information verification device 300 has a decoding unit 320 which decodes the tracking information generated by encryption by the digital watermark detection device 200, using the public key which is the pair to the secret key used by the digital watermark detection device 200; and a collating unit 322 which collates the information obtained by decoding by the decoding unit, with the identification information for verification use.

More specifically, the identification information verification device 300 has, as illustrated in FIG. 14, an identification information accepting unit 310, the decoding unit 320, the collating unit 322, a decision unit 324, a notifying unit 326, and the digital certificate storage unit 340.

The identification information accepting unit 310 accepts the identification information and information uniquely determined based on the identification information which were reported as being identified by the administrator of the digital watermark detection device 200. The identification information accepting unit 310 may receive, for example, the identification information and information uniquely determined based on the identification information which were sent from the digital watermark detection device 200 through the network 3. Alternatively, the identification information accepting unit 310 may read the identification information, and the information uniquely determined based on the identification information written in e-mail, or recorded in a recording medium, and accept them.

The identification information accepting unit 310 acquires the public key, which is the pair to the secret key used in the digital watermark embedding device 100 or the digital watermark detection device 200, together with the digital certificate 410, and stores them in the digital certificate storage unit 340.

The decoding unit 320 decodes the information, which is received from the identification information accepting unit 310 and is uniquely determined based on the identification information, using the public key stored in the digital certificate storage unit 340. The public key is tied, for example, to the administrator of the digital watermark embedding device 100 or the digital watermark detection device 200 as described in the above, and is the pair to the secret key used for embedding or detection of the digital watermark. The decoding unit 320 confirms whether the public key and the owner information thereof are correct or not, using the digital certificate 410. Since correlation between the public key and the owner information may be confirmed by any general method using the digital certificate and is not essential to the present invention, so that it will not be detailed.

The collating unit 322 collates the information decoded by the decoding unit 320, with the identification information supposed to be detected by the digital watermark detection device 200 and accepted by the identification information accepting unit 310.

If the collating unit 322 determined that both information agreed, the decision unit 324 may determine that the identification information posted by the digital watermark detection device 200 is valid. On the other hand, if the collating unit 322 determined that both information did not agree, the decision unit 324 may determine that the identification information posted by the digital watermark detection device 200 is invalid.

The notifying unit 326 notifies the results of determination by the decision unit 324 to the administrator of the identification information verification device 300 or the user who asked for verification.

Methods of notification are selectable from those of various types without special limitation. For example, a notification process similar to that implemented by the above-described notifying unit 228 in the digital watermark detection device 200 is adoptable. The notifying unit 326 may notify validity of the identification information to the administrator of the digital watermark detection device 200 or other users through the network 3. In this way, the administrator of the identification information verification device 300 or the user who asked for verification can confirm the validity of the identification information notified by the administrator of the digital watermark detection device 200.

As described in the above, in the digital watermark embedding device 100 and the digital watermark detection device 200 of the digital content management system 1 according to this exemplary embodiment, the aforementioned various units are implemented as various functions, by various operations corresponded to the program executed by the CPU.

The computer program of this exemplary embodiment is described so as to make a computer, the computer being configured to implement the digital watermark embedding device 100 for embedding the digital watermark into the digital content, execute a procedure of generating the embedding information uniquely determined from the identification information for tracking use, and embedding the digital watermark into the digital content to be managed, based on the thus-generated embedding information.

In addition, the computer program of this exemplary embodiment is described so as to make a computer, the computer being configured to implement the digital watermark detection device 200 for detecting the digital watermark embedded into the digital content, execute a procedure of generating the tracking information uniquely determined from the identification information for verification use which includes the identification information same as that contained in the identification information for tracking use which was used when the digital watermark was embedded, and detecting the digital watermark in the digital content to be verified based on the thus-generated tracking information.

The computer program of this exemplary embodiment is described so as to make a computer, the computer being configured to implement the identification information verification device 300, execute a procedure of generating the tracking information uniquely determined from the identification cation information for verification use, and verifying the identification information for verification use which was supposed to be used by the digital watermark detection device 200 for detecting the digital watermark, when the digital content to be verified in which the digital watermark was detected was verified, in the digital content to be verified based on the thus-generated tracking information.

The computer program of this exemplary embodiment may be recorded in a computer-readable recording medium. The recording medium may have a variety of forms, without special limitation. The program may also be loaded on a memory of the computer from the recording medium, or downloaded through the network into the computer and then loaded on the memory.

Operations of the thus-configured digital content management system 1 of this exemplary embodiment will be explained below. In this exemplary embodiment, there are two flows: digital watermark embedding process, and digital watermark detection process.

In the digital watermark embedding process, the digital watermark embedding device 100 embeds the digital watermark, by generating one or more file names which are used later as the digital watermark, and then by newly creating files having the thus-generated names in the target digital content.

In the digital watermark detection process, the digital watermark detection device 200 detects the digital watermark in the target digital content, by confirming whether the files having the names generated as the digital watermark are found in the target digital content or not.

<Digital Watermark Embedding Process>

First, the digital watermark embedding process implemented by the digital watermark embedding device 100 in the digital content management system 1 of this exemplary embodiment will be explained.

Figure 6:
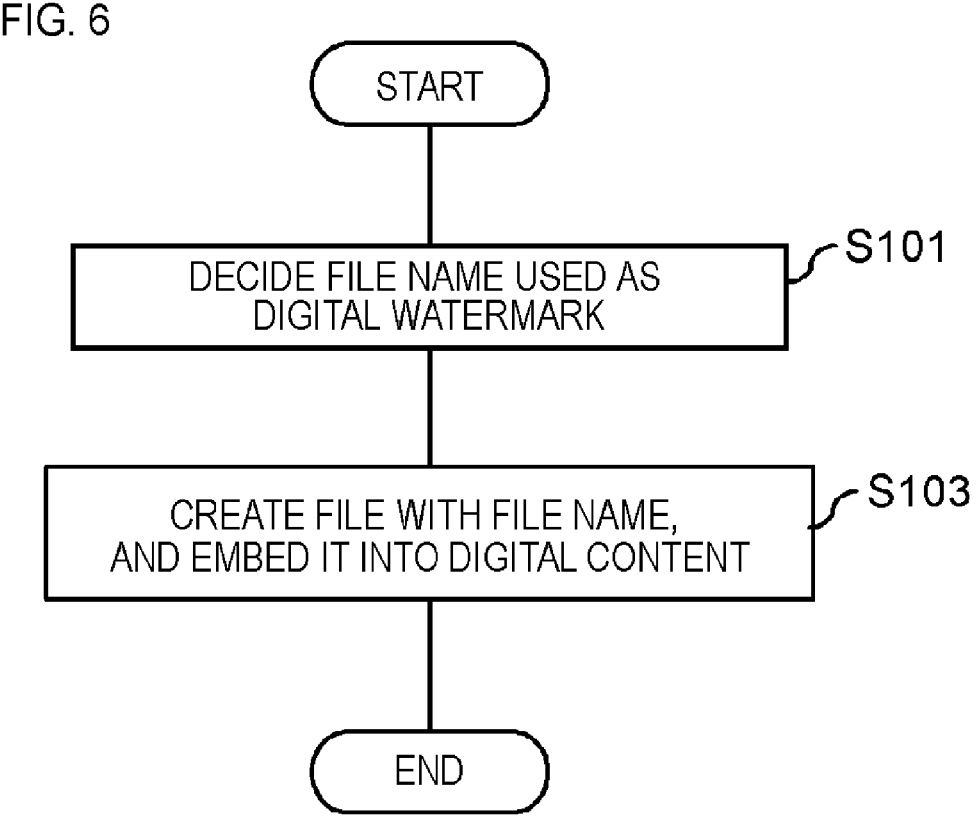
FIG. 6 is a flow chart illustrating an exemplary operation of a digital watermark embedding process which proceeds in the digital content management system of this exemplary embodiment.
Figure 7:
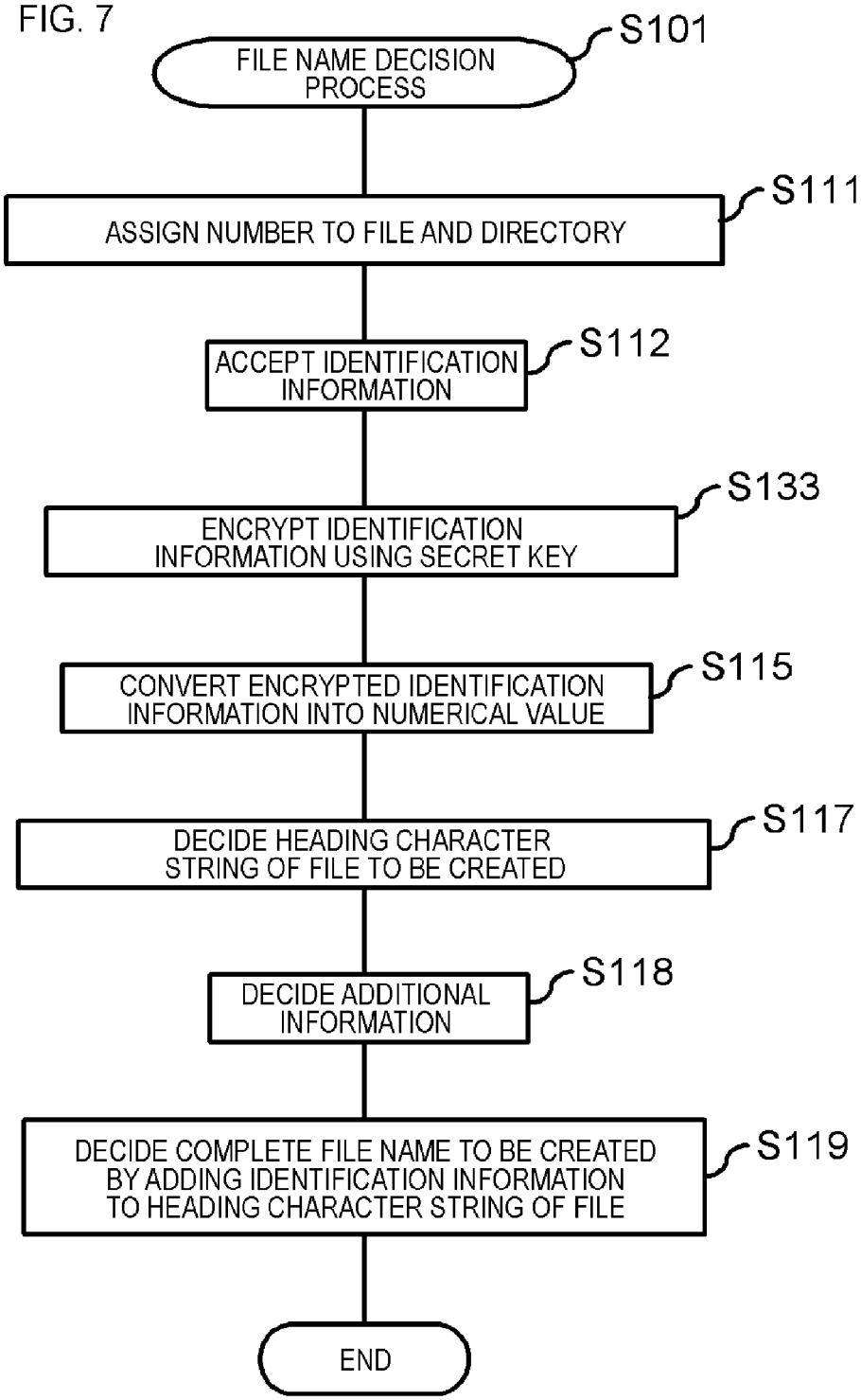
FIG. 7 is a flow chart illustrating an exemplary operation of a file name decision process, in the process of embedding a digital watermark by the digital content management system of this exemplary embodiment.
Figure 8:
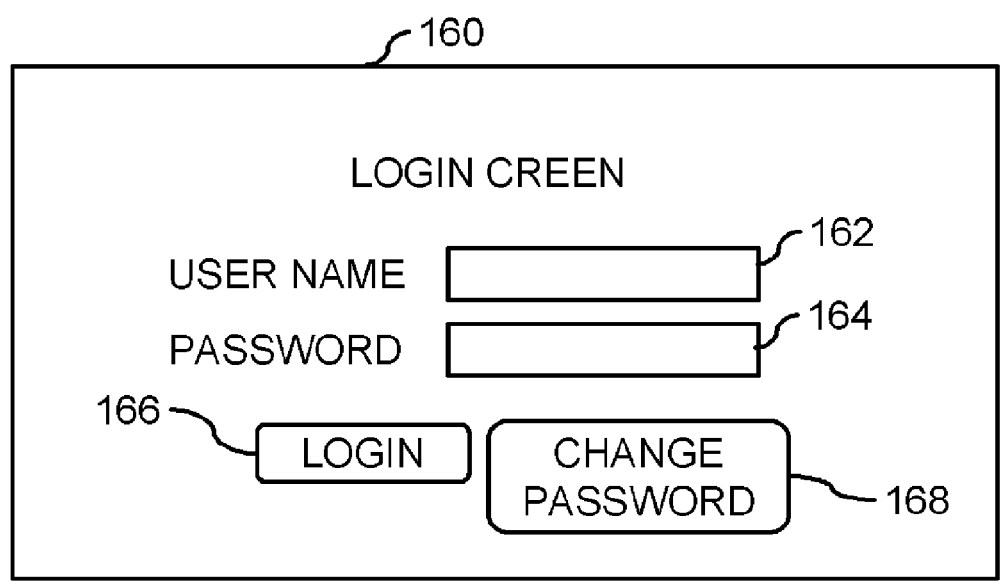
FIG. 8 is a drawing illustrating an exemplary login screen of the digital content management system of this exemplary embodiment.
Figure 9:
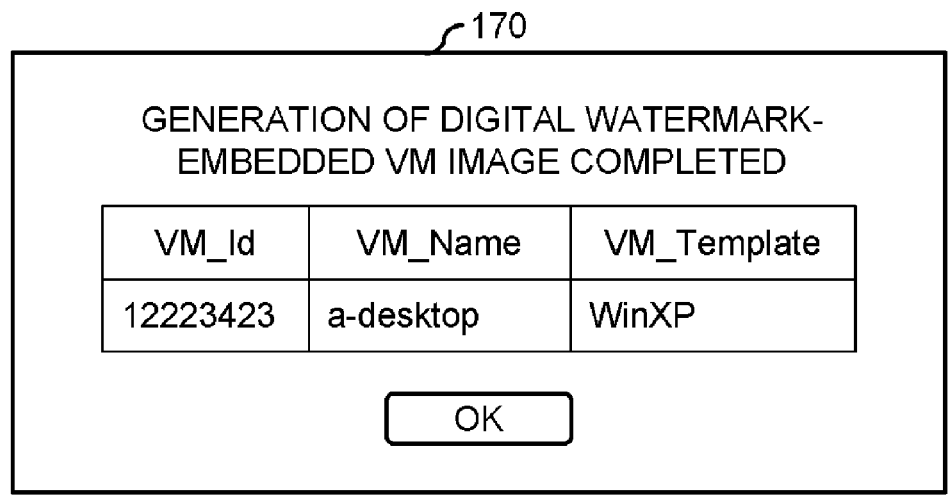
FIG. 9 is a drawing illustrating an exemplary screen which indicates the completion of generation, in the digital watermark embedding process by the digital content management system of this exemplary embodiment.

FIG. 6 is a flow chart illustrating an exemplary procedure of the digital watermark embedding process which proceeds in the digital content management system 1 of this exemplary embodiment. FIG. 7 is a flow chart illustrating an exemplary procedure of the file name decision process in the digital watermark embedding process illustrated in FIG. 6. FIG. 8 and FIG. 9 are exemplary image displays which appear in the processes which proceed in the digital content management system 1 of this exemplary embodiment. The process will be explained referring to FIG. 1 to FIG. 9.

As illustrated in FIG. 6, the digital content management method implemented by the digital watermark embedding device 100 of this exemplary embodiment is typified by generating the embedding information uniquely determined from the identification information for tracking use (step S101), and embedding the digital watermark into the digital content to be managed, based on the thus-generated embedding information (step S103).

As illustrated in FIG. 7, the data processing method which proceeds in the digital watermark embedding device 100, according to the exemplary embodiment of the present invention, is configured to make the digital watermark embedding device 100 detect the file names of the files or the file names containing the directory names in the digital content to be managed, and assign the content layout identification information to each of the thus-detected file names (step S111); accept the identification information for tracking use (step S112); collate the embedding locations uniquely determined based on the thus-accepted identification information for tracking use, with the content layout identification information so as to specify them (step S133, step S115, and step S117); generate the file names to be embedded by adding, to the file names at the thus-specified embedding locations, the information uniquely determined based on the thus-accepted identification information for tracking use (step S118, step S119); generate the files having the thus-generated file names to be embedded (step S103 in FIG. 6); and embeds the thus-generated files into the digital content to be managed as the digital watermark, based on the content layout identification information (step S103 in FIG. 6).

Step S111 may succeed step S112 to step S115. If the output of step S133 is originally a numerical value, step S115 is omissible.

More specifically, as illustrated in FIG. 6, the digital watermark embedding device 100 generates the file names which are used later as the digital watermark embedded into the target digital content, using the file name decision unit 130 (step S101). The digital watermark embedding device 100 then newly creates the files having the file names generated in step S101, used later as the digital watermark, into the target digital content using the embedding unit 120 (step S103).

Next, the process in step S101 shown in the flow chart of FIG. 6 will be detailed, referring to FIG. 7.

First, the number assigning unit 112 assigns the numbers to the files and directories in the digital content, and determines unique numerical values corresponded to the individual files and directories, that is, the absolute paths (step S111). A method of numbering adoptable herein may be based on alphabetical order.

Next, the accepting unit 111 accepts the identification information for tracking use (step S112). The encryption unit 133 then encrypts the thus-accepted identification information for tracking use, using the secret key stored in the key storage unit 140 (step S133). The numerical value conversion unit 114 then converts the thus-encrypted identification information for tracking use into numerical values (step S115).

Next, out of the paths correlated with numerical values by the number assigning unit 112, the specifying unit 115 determines the heading character strings of the paths corresponded to the numerical values generated using the numerical value conversion unit 114 (step S117). On the other hand, the identification information adding unit 116 determines the additional information corresponded to the numerical values generated by the numerical value conversion unit 114, and directs the file name generating unit 118 to add them to the file names (step S118).

The file name generating unit 118 then adds the additional information generated by the identification information adding unit 116, to the file names determined in step S115 at the locations therein which come after the heading character strings, to thereby determine the final file names (step S119).

For example, upon startup of the program for the digital content management system 1 of this exemplary embodiment, the digital watermark embedding device 100 or the digital watermark detection device 200 prompts the operator to enter the user name and the password, to an user name entry field 162 and a password entry field 164 on a login screen 160 illustrated in FIG. 8, and accepts the user name and the password entered by the operator. Based on the user name and the password accepted in response to the acceptance of holding down a login button 166, only the authenticated operator is allowed to use the system.

Note that the method of authenticating the user adoptable herein is not limited thereto, but may be any general methods, including biometric authentication, authentication by ID card and so forth. On the login screen 160, the password may occasionally be altered, by a password change button 168 to shift to a password change screen (not illustrated).

As described in the above, in this exemplary embodiment, the accepting unit 111 of the digital watermark embedding device 100 accepts the user name, which was entered by the operator on the login screen 160, as the identification information for tracking use.

In the digital content management system 1 of this exemplary embodiment, upon completion of the process of embedding of the digital watermark by the digital watermark embedding device 100, a completion notification screen 170 such as illustrated in FIG. 9 is presented to the operator. Methods of presentation to the user is not limited to image display, but may be command line display, recording into a log file, notification by mail or messenger, and printing of a report and so forth.

FIG. 9 illustrates an exemplary case where production of a VM image, which is the digital content to be managed, and embedding of the digital watermark took place at the same time.

In this way, the digital watermark is embedded into the digital content to be managed. In this exemplary embodiment, the information designated by the operator, or uniquely determined based on a predetermined identification information for tracking use, is embedded as the digital watermark. Accordingly, as will be described later, the digital watermark may be detected in the digital content to be verified, using the identification information for tracking use, and a creator of the digital content to be verified will be made clear based on the identification information.

<Digital Watermark Detection Process>

Next, the digital watermark detection process implemented by the digital watermark detection device 200 in the digital content management system 1 of this exemplary embodiment will be explained.

Figure 10:
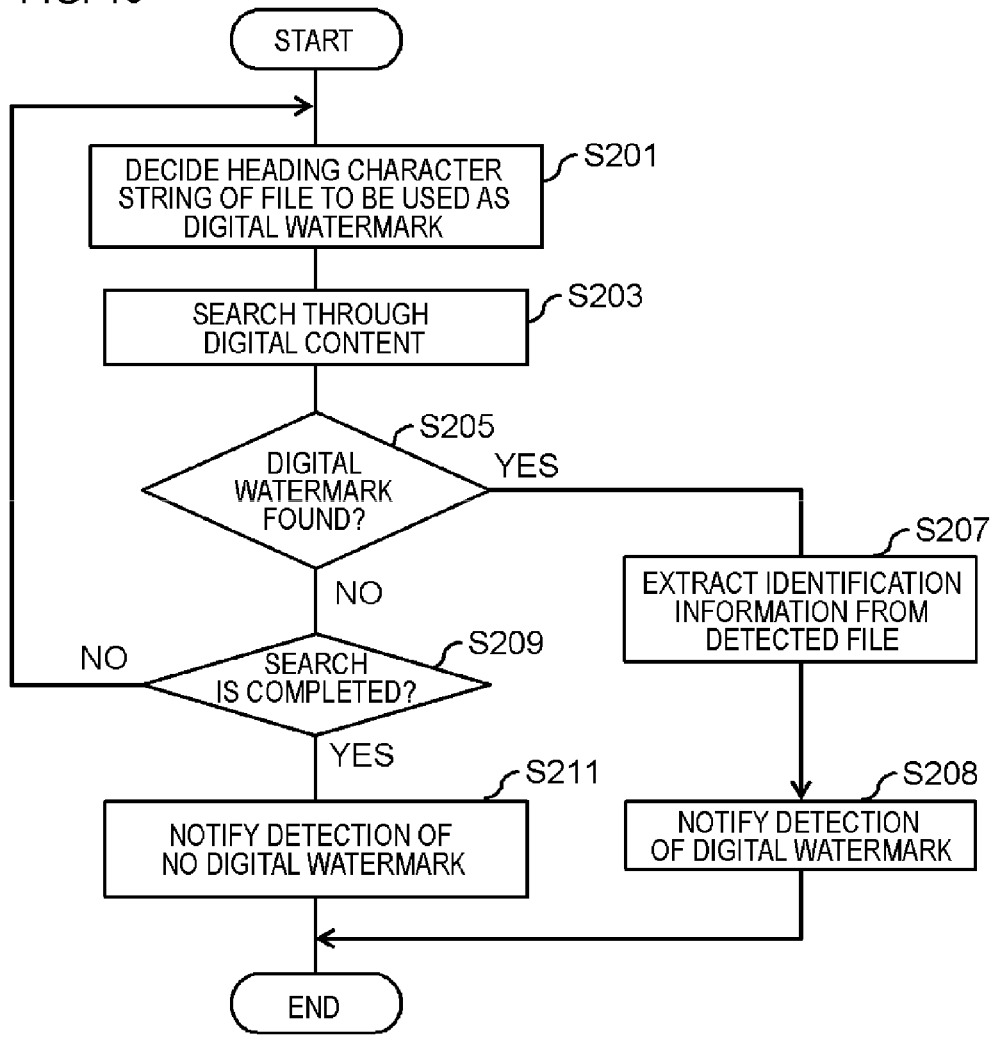
FIG. 10 is a flow chart illustrating an exemplary operation of a digital watermark detection process by the digital content management system of this exemplary embodiment.
Figure 11:
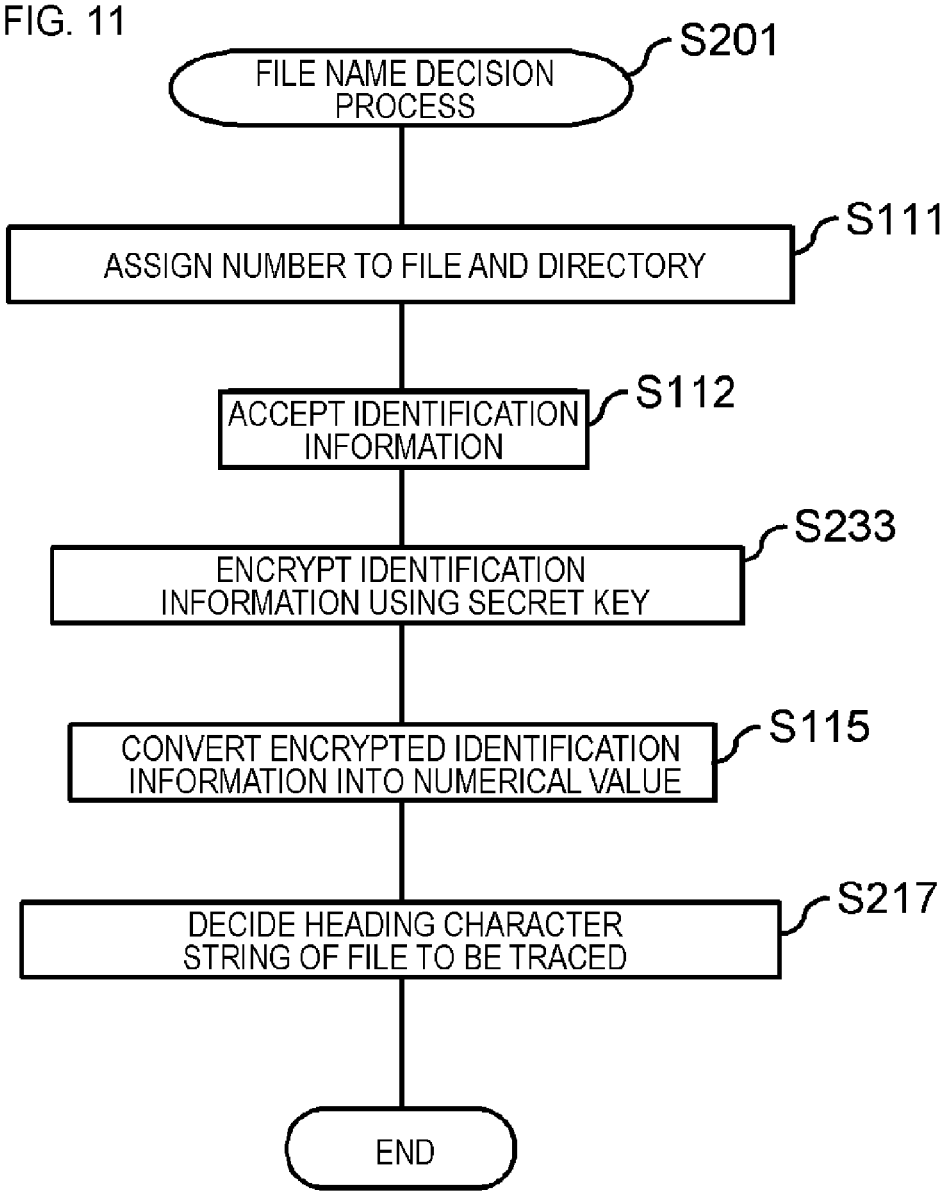
FIG. 11 is a flow chart illustrating an exemplary operation of a file name decision process, in the process of detecting a digital watermark by the digital content management system of this exemplary embodiment.
Figure 12:
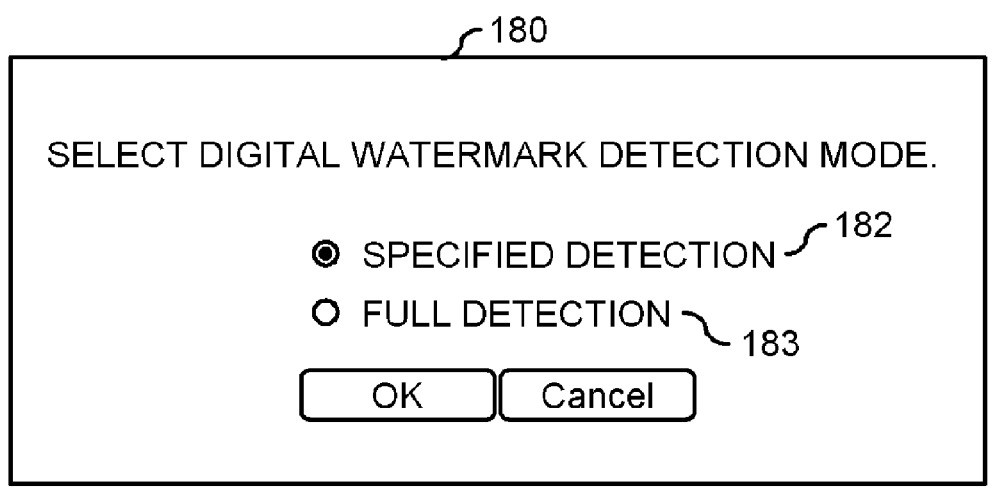
FIG. 12 is a drawing illustrating an exemplary screen which allows thereon selection of detection modes of digital watermark on the digital content management system of this exemplary embodiment.
Figure 13:
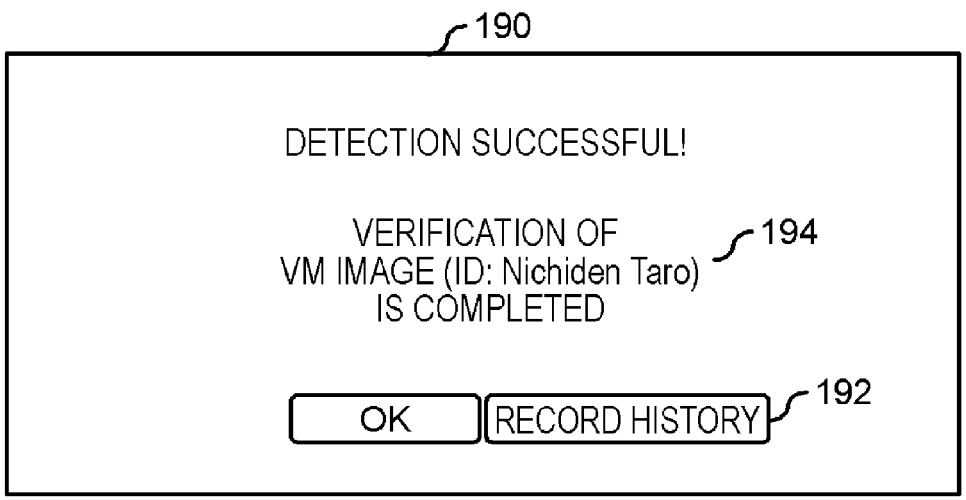
FIG. 13 is a drawing illustrating an exemplary screen displayed when the digital watermark was detected in the process of detecting digital watermark by the digital content management system of this exemplary embodiment.

FIG. 10 is a flow chart illustrating an exemplary procedure of a digital watermark detection process by the digital content management system 1 of this exemplary embodiment. FIG. 11 is a flow chart illustrating an exemplary procedure of the file name decision process in the digital watermark detection process illustrated in FIG. 10. FIG. 12 and FIG. 13 are drawings illustrating exemplary screens which appear during the individual processes implemented by the digital content management system 1 of this exemplary embodiment. The process will be explained referring to FIG. 1, FIG. 4, and FIG. 10 to FIG. 13.

As illustrated in FIG. 10, according to a digital content management method implemented by the digital watermark detection device 200 of this exemplary embodiment, includes generating the tracking information uniquely determined from the identification information for verification use, which contains the identification information same as that contained in the identification information for tracking use which was used when the digital watermark was embedded (step S201), and detecting the digital watermark in the digital content to be verified, based on the thus-generated tracking information (step S203).

As illustrated in FIG. 11, the data processing method implemented by the digital watermark detection device 200 according to the exemplary embodiment of the present invention makes the digital watermark detection device 200 detect the file names of the files or the file names containing the directory names in the digital content to be verified, and assign content layout identification information to each of the thus-detected file names (step S111); accept the identification information for verification use (step S112); specify the search locations uniquely determined based on the thus-accepted identification information for verification use, by collating them with the content layout identification information (step S233, step S115, step S217); generate at least part of the file names at the thus-specified search locations as the search file names (step S201 in FIG. 10); and detect the files having at least part of the search file names in the digital content to be verified (step S203 in FIG. 10).

Note that step S111 may succeeds step S112 to step S115. If the output of step S233 is originally a numerical value, step S115 is omissible.

More specifically, as illustrated in FIG. 10, in the digital watermark detection device 200, the file name decision unit 230 generates the heading character strings of the file names used as the digital watermark, from identification information to be collated (user's name, for example) (step S201). The search unit 220 then searches into the digital content to be verified, so as to find the files having the file names used as the digital watermark, based on the information generated in step S201 (step S203). If the digital watermark was found in the digital content to be verified (YES in step S205), the extraction unit 222 extracts additional information (added by the identification information adding unit 116 in the file name decision unit 130 of the digital watermark embedding device 100) in the thus-searched file names of the files, the collating unit 224 collates the thus-extracted additional information with the information uniquely determined based on the identification information for verification use, and the identification information identifying unit 226 identifies the identification information for verification use when both information were found to agree (step S207). The notifying unit 228 notifies the user that the digital watermark corresponded to the identification information to be collated was detected (step S208), and the process comes to the end. In this process, also the identification information for verification use identified in step S207 may be notified to the user. If the digital watermark was not found in the digital content to be verified (NO in step S205), and if the search into the digital content has completed (YES in step S209), the notifying unit 228 notifies the user that the digital watermark was not detected (step S211), and the process comes to the end. If the search into the digital content has not been completed (NO in step S209), the process returns back to step S201, and the search continues.

If the digital content to be verified has been attacked to remove the digital watermark or to falsify the content, part of the file which is used as the digital watermark may be lost. In this case, whether the digital watermark was detected or not may be determined, for example, by preliminarily determining a guideline describing that agreement of how many files, out of the files generated in step S201, is necessary to judge detection of the digital watermark. The guideline may be accepted through an unillustrated setup screen, and may be stored in a memory.

In the digital watermark detection process, for example, as illustrated in FIG. 12, a range of detection may be set on a detection mode selection screen 180. For example, when there are a plurality of digital contents to be verified, selection may be made between a method of searching by specifying the identification information for verification use to be collated (specified detection 182); and a method of searching into the entire content (full detection 183) without specifying the identification information for verification use to be collated, but using all or part of identification information for verification use, that is, all or part of every possible identification information, typically including user IDs of all employees of a company, or user IDs of employees in a specific department. For the case where suspicious content has already been specified to some degree, the specified detection 182 is selectable. According to the specified detection 182, since the accepting unit 211 may accept the identification information for verification use to be collated, and may detect the digital watermark in the specified contents. The specified detection 182 may therefore shorten the search time and is more efficient, as compared with the full detection 183 characterized by a round-robin scheme of detection.

Upon completion of searching of the digital watermark, a result screen 190 is displayed as illustrated in FIG. 13. The drawing shows an exemplary case where the digital content to be verified is a VM image. The result screen 190 shows whether the digital watermark was detected or not, and the identification information identifying unit 226 displays the thus-identified identification information for tracking use in a display field 194. The result screen 190 may show thereon other information of the digital content, such as survival rate of file available as the digital watermark. The survival rate herein means a percentage of a survived portion of the digital content having been attacked and falsified, and may be estimated based on, for example, the survival rate of digital watermark. Upon acceptance of holding down a history record button 192, results of verification may be recorded in a history. Alternatively, the results of verification may be recorded into the history of verification, automatically upon completion of the search process. Still alternatively, a reference screen (not illustrated) may be displayed or printed out, upon acceptance of operation of the history record button 192.

<Identification Information Verification>

When the identification information was identified by the digital watermark detection device 200, or reported to be identified by the administrator, the identification information verification device 300 verifies validity of the thus-identified identification information.

Procedures of verification of the identification information by the identification information verification device 300 of this exemplary embodiment will be explained, referring to FIG. 15. FIG. 15 is a flow chart illustrating an exemplary procedure of verifying the identification information by the identification information verification device 300 of this exemplary embodiment.

The data processing method implemented by the identification information verification device 300 of this exemplary embodiment is configured so that the identification information verification device 300 generates the tracking information uniquely determined from the identification information for verification use, and verifies the identification information for verification use which was supposed to be used by the digital watermark detection device 200 for detecting the digital watermark, when the digital content to be verified in which the digital watermark was detected was verified, in the digital content to be verified based on the thus-generated tracking information.

More specifically, first, in the identification information verification device 300, the identification information accepting unit 310 accepts the identification information, and the information uniquely determined based on the identification information, from the digital watermark detection device 200 (step S301). In this process, the identification information accepting unit 310 may also accept, from the digital watermark detection device 200, the digital certificate 410 of the public key, which is the pair to the secret key used when the digital content was detected, and may store it into the digital certificate storage unit 340. The decoding unit 320 then decodes the information uniquely determined based on the identification information accepted by the identification information accepting unit 310, using the public key contained in the digital certificate 410 stored in the digital certificate storage unit 340 (step S303). The public key is proven for the owner thereof by the certificate authority 400, and is the pair to the secret key which was used when the digital watermark was embedded by the digital watermark embedding device 100, and used when the digital watermark was detected by the digital watermark detection device 200.

Then, the collating unit 322 collates the identification information accepted in step S301 by the identification information accepting unit 310, with the identification information obtained in step S303 by decoding by the decoding unit 320 (step S305). Based on the result of collation, the decision unit 324 determines validity of the identification information. More specifically, if both identification information were found to agree by the collation process in step S305 (YES in step S305), the decision unit 324 determines that the identification information submitted by the administrator of the digital watermark detection device 200 is valid. The notifying unit 326 then notifies that the identification information is valid (step S307).

On the other hand, if both identification information were found to disagree by the collation process in step S305 (NO in step S305), decision unit 324 determines that the identification information submitted by the administrator of the digital watermark detection device 200 is invalid. The notifying unit 326 then notifies that the identification information is invalid (step S309). In this way, it may find that the administrator of the digital watermark detection device 200 has submitted false identification information.

As has been described in the above, according to the digital content management system 1 of this exemplary embodiment, since the digital watermark embedding device 100 uses the file names to be embedded into the digital content as the digital watermark, so that any general digital content containing file sets are now traceable, irrespective of file system, OS, version of kernel, file format and so forth.

Also since the digital watermark embedding device 100 ties identification information for tracking use of the digital content to be managed, to the file names used later as the digital watermark, and embeds the file names as the digital watermark information, so that it is less recognizable that the identification information for tracking use of the content is hidden, but they are readily detectable.

Since the digital watermark detection device 200 can restore the identification information for tracking use embedded into the digital content, directly from the file names, having been used as the digital watermark and detected in the digital content, so that it is no longer necessary to externally store correlation between the file name to be used as the digital watermark and the identification information for tracking use.

According to the identification information verification device 300, whether the identification information for tracking use, supposed to be detected by the digital watermark detection device 200, is valid or not may be authenticated by the third party. In other words, whether the administrator of the digital watermark detection device 200 has been made a false report or not may be verified by the identification information verification device 300, based on the identification information which was submitted, supposing that the digital watermark was detected in the digital content to be verified, and based on the information uniquely determined based on the identification information.

In addition, since the digital content management system 1 of this exemplary embodiment may be used in combination with a variety of data hiding techniques, so that the strength of the digital watermark may be improved by combining a plurality of techniques.

Having described the exemplary embodiments of the present invention referring to the attached drawings, merely as illustrative examples, also various configurations other than those described in the above are adoptable.

For example, in the digital content management system 1 of this exemplary embodiment, if new files or new directories are created in the digital content to be managed, which has the files to be used as the digital watermark already embedded therein, the numbers assigned to the files may be different from those assigned in the embedding process. Possible solutions to the problem are as follow:

A first possible solution relates to discrimination based on generation time of the files. In the digital content management system 1 of this exemplary embodiment, the digital watermark detection device 200 may determine, as a target of verification, a portion of the digital content to be verified which remains after excluding the files or directories created after the creation time of the digital content to be managed.

More specifically, in the digital content management system 1 of the above-described exemplary embodiment, the digital watermark embedding device 100 further has a recording unit (not illustrated) which records time information, indicating the time at which the identification information for tracking use was embedded as the digital watermark into the digital content to be managed, typically in the digital content to be managed, or an external storage device. The digital watermark detection device 200 further has a decision unit (not illustrated) which discriminates, in the process of detection of the digital watermark, based on the time information, whether the creation time of the files or directories in the digital content to be verified is later than the embedding time or not. The number assigning unit 112 in the file name decision unit 230 then assigns the numbers to the files or directories, while excluding those created after the embedding time.

According to this configuration, since the files or directories created after the creation time of the digital content to be managed are excluded from the digital content to be verified, so that a correlation between the files or directories with the assigned numbers may be maintained equally to that obtained when the digital content to be managed was created.

A second possible solution relates to discrimination based on comparison with the original version. This method is aimed at the case where the creation time of files or directories was falsified by the attacker so that the aforementioned technique is no longer adoptable, or for the case where a part of the files have been destroyed, lost or deleted, so that the discrimination is now based on the original version of the digital watermark (VM image before being embedded with the watermark).

In the digital content management system 1 of this exemplary embodiment, the digital watermark detection device 200 compares the digital content to be managed and the digital content to be verified, and determines the files or directory-containing files as a target of verification, if a difference is found between the digital content to be verified and the digital content to be managed.

More specifically, in the digital content management system 1 of this exemplary embodiment, the digital watermark embedding device 100 keeps and manages an original version of the digital content to be embedded with the digital watermark. Method of management herein is not specifically limited. For example, the digital watermark embedding device 100 may have a recording unit (not illustrated) which automatically records ID of the digital content of the original version into a management table, when the digital content to be managed was created by embedding the digital watermark.

Then, using the digital watermark embedding device 100, a list of the file names, which are used later as the digital watermark corresponded to the identification information for tracking use, is created according to procedures similar to those used when the identification information for tracking use to be collated are embedded into the thus-maintained original version. The search unit 220 in the digital watermark detection device 200 then verifies whether the files having the file names contained in the list are found in the digital content to be verified, for example, in the file system of VM image, or not. If the files were found, this means that the digital watermarks were detected, whereas if the files were not found, this means that the digital watermarks were not detected.

As described in the above, since the digital watermark embedding device 100 reproduces the file names to be used as the digital watermark, as if they were existed in the digital content immediately after embedding of the digital watermark, that is, in the digital content having not been falsified, or causing no omission of the files, so that the digital content may be verified, even if the digital content to be verified have been falsified or the files have been omitted.

In the digital content management system 1 according to the exemplary embodiment of the present invention, the digital watermark embedding device 100 may locate the files, which are used later as the digital watermark, in a distributed manner so as to make each of the existing directories equally probable to have the digital watermark.

While a flow chart will not be shown, an exemplary method of embedding implemented by the digital watermark embedding device 100 is configured so that, the encryption unit 133 encrypts the identification information for tracking use (step S401); the numerical value conversion unit 114 converts them into numerical values (step S403); the numerical value conversion unit 114 converts the numerical values obtained in step S403 into random numbers (sequence) X using them as seeds, typically according to a random number generation method such as the Mersenne Twister method, which always reproduces the same random number sequence from the same random number seed (step S405); the specifying unit 115 selects the directories corresponded to the random numbers X, with respect to the directories having preliminarily been numbered (step S407), and determines the heading character strings which correspond to the random numbers X, when the files are arranged for example in alphabetical order in the identified directories (step S409); and the identification information adding unit 116 issues an instruction of adding X to the file names (step S411). Step S401 to step S411 may be repeated (step S413).

Since different seeds give different random numbers in step S405, so that the destination folders will successfully be randomized. In step S407, if number of directories N is smaller than X, then X may be adjusted to satisfy $0 \leq X \leq N$ by using "remainder obtained by dividing X by N".

According to the thus-configured digital content management system 1, the files used as the digital watermark may be located in a distributed manner so as to make each of the existing directories in the digital content to be managed equally probable to have the digital watermark. Accordingly, not only the above-described effects are successfully obtained, but also it is avoidable that only a limited range of directories are heavily embedded with the digital watermark.

In this way, it is now avoidable that some specific directories are recognized as weak points, when attacked to delete or falsify them.

In the digital content management system 1 of this exemplary embodiment, the digital watermark embedding device 100 may give the file names of the files newly created as the watermark, so as to assimilate those of other existing files in the same directory. For example, the file names generated by the digital watermark embedding device 100 may be given as <heading character string><similar character string><additional information>.<extension>.

While the heading character string and the additional information are necessarily fixed, the other portions of the file names may be assimilated, so that the files to be used as the digital watermark may be given the names similar to those of other files in the directories of the digital content to be managed, and thereby confidentiality of the digital watermark may further be improved.

Methods of generating the similar character strings are not specifically limited.

According to this configuration, not only the above-described effects are successfully obtained, but also the digital watermark are made more difficult to be falsified or removed by the attacker, since the file names are made more difficult to be discriminated from those of the existing file set.

While the present invention has been explained referring to the exemplary embodiments and Examples, the present invention is by no means limited by the above-described exemplary embodiments and Examples. Configurations and details of the present invention may be modified in various ways so far as those skilled in the art can understand, within the scope of the present invention.

SUPPLEMENTARY NOTE

The present invention also includes the exemplary embodiments listed below.

(Supplementary note 1) A digital content management system which includes:

a digital watermark embedding unit (digital watermark embedding device 100) which generates embedding information uniquely determined from the identification information for tracking use, and embeds a digital watermark into a digital content to be managed, based on the thus-generated embedding information;

a digital watermark detection unit (the digital watermark detection device 200) which generates tracking information uniquely determined from identification information for verification use, and detects the digital watermark in a digital content to be verified based on the thus-generated tracking information; and a verification unit (the identification information verification device 300) which verifies the identification information for verification use supposed to be used for verifying the digital content to be verified in which the digital watermark was detected, the digital watermark embedding unit (the digital watermark embedding device 100) includes:

an identification information accepting unit (the accepting unit 111) which accepts the identification information for tracking use;

an assigning unit (the number assigning unit 112) which detects file names of files, or file names containing directory names in the digital content to be managed, and assigns a different number to each of the thus-detected file names;

the encryption unit 133 which encrypts the thus-accepted identification information for tracking use using a secret key;

the numerical value conversion unit 114 which converts the thus-encrypted identification information for tracking use into a numerical value; and the file name-to-be-embedded generation unit 118 which specifies the file name having the number corresponded to the numerical value generated by the numerical value conversion unit 114, and adds the numerical value or correspondent information to a predetermined location of addition in the thus-specified file name, to thereby generate a file name to be used as the digital watermark, the digital watermark embedding unit (the digital watermark embedding device 100) generates a file having the file name to be embedded generated by the file name-to-be-embedded generating unit 118, and embeds it as the digital watermark into the digital content to be managed.

(Supplementary note 2) The digital content management system according to (Supplementary note 1), wherein the digital watermark detection unit (the digital watermark detection device 200) includes:

the number assigning unit 112 which detects file names of files or file names containing the directory names in the digital content to be verified, and assigns a different number to each of the thus-detected file names;

an identification information accepting unit (the accepting unit 211) which accepts the identification information for verification use;

the encryption unit 233 which encrypts the thus-accepted identification information for verification use, using a secret key same as that used by the digital watermark embedding unit;

the numerical value conversion unit 114 which converts the thus-encrypted identification information for verification use into a numerical value;

a heading character string specifying unit (the specifying unit 115) which specifies heading character strings of the file names having the numbers corresponded to the numerical values generated by the numerical value conversion unit 114; and a digital watermark collating unit (the collating unit 224) which detects file names to be used as the digital watermark in the digital content to be verified, based on the thus-specified file names, extracts the tracking information corresponded to the numerical values from the file names, and collates them with the identification information for verification use.

(Supplementary note 3) The digital content management system according to (Supplementary note 2), wherein the verification unit (the identification information verification device 300) includes:

the decoding unit 320 which decodes the tracking information generated by encryption by the digital watermark detection unit (digital watermark detection device 200), using a public key which is the pair to the secret key used in the digital watermark detection unit; and the collating unit 322 which collates information obtained by decoding by the decoding unit 320, with the identification information for verification use.

(Supplementary note 4) A program making a computer implement a verification device, the verification device (the identification information verification device 300) being configured to verify identification information for verification use, which is supposed to be used for verifying a digital content to be verified in which a digital watermark was detected by a digital watermark detection device 200, the digital watermark detection device 200 being configured to generate tracking information uniquely determined from identification information for verification use, and to detect the digital watermark in the digital content to be verified, based on the thus-generated tracking information, the program includes:

a procedure of accepting, from the digital watermark detection device 200, tracking information uniquely determined from the identification information for verification use, by encryption using a secret key, and the identification information for verification use supposed to be used for verifying the digital content to be verified, in which a digital watermark was detected;

a procedure of decoding the tracking information using a public key which is the pair to the secret key used in the digital watermark detection device; and a procedure of collating information obtained by decoding, with the identification information for verification use.

(Supplementary note 5) The program according to (Supplementary note 4), being configured to further making the computer execute a procedure of determining the identification information for verification use as valid, when agreement was found in the procedure of collation between information obtained by decoding and the identification information for verification use.

(Supplementary note 6) The program according to (Supplementary note 3) or (Supplementary note 4), being configured to further making a computer execute a procedure of determining the identification information for verification use as invalid, when disagreement was found in the procedure of collation between information obtained by decoding and the identification information for verification use.

(Supplementary note 7) A data processing method for a verification device (the identification information verification device 300), the verification device (the identification information verification device 300) being configured to verify identification information for verification use, which is supposed to be used for verifying a digital content to be verified in which a digital watermark was detected by a digital watermark detection device 200, the digital watermark detection device 200 being configured to generate tracking information uniquely determined from identification information for verification use, and to detect the digital watermark in the digital content to be verified, based on the thus-generated tracking information, the verification device (the identification information verification device 300) being configured:

to accept, from the digital watermark detection device 200, tracking information uniquely determined from identification information for verification use, by encryption using a secret key, and the identification information for verification use supposed to be used for verifying the digital content to be verified, in which the digital watermark was detected;

to decode the tracking information using a public key which is the pair to the secret key used in the digital watermark detection device; and to collate information obtained by decoding with the identification information for verification use.

(Supplementary note 8) The data processing method for a verification device (the identification information verification device 300) according to (Supplementary note 7), wherein the verification device (identification information verification device 300) determines the identification information for verification use as valid, when agreement was found between information obtained by decoding and the identification information for verification use.

(Supplementary note 9) The data processing method for a verification device (the identification information verification device 300) according to (Supplementary note 7) or (Supplementary note 8), wherein the verification device (identification information verification device 300) determines the identification information for verification use as invalid, when disagreement was found between information obtained by decoding and the identification information for verification use.

This application claims priority right based on Japanese Patent Application No. 2010-083716 filed on Mar. 31, 2010, the entire content of which is incorporated hereinto by reference.

What is claimed is:

1. A digital content management system comprising:
   a server computer or a personal computer,
   a memory,
   a hard disk and
   a communication device, wherein when the server computer or the personal computer reads a program loaded onto the memory for the purpose of implementing:
   a digital watermark embedder which generates embedding information uniquely determined from identification information for tracking use, specifies an embedding location uniquely determined based on the generated embedding information, and embeds a digital watermark based on the generated embedding information into a digital content to be managed, based on the specified embedding location;
   a digital watermark detector which generates tracking information uniquely determined from identification information for verification use, specifies a search location uniquely determined based on the generated tracking information, and detects said digital watermark based on the generated tracking information in a digital content to be verified, based on the specified search location;
   a verifier which verifies said identification information for verification use, which is used for verifying said digital content to be verified, in which, said digital watermark is detected;
   wherein said digital watermark embedder generates said embedding information uniquely determined from said identification information for tracking use, by encryption using a secret key, and embeds the digital watermark into said digital content to be managed, based on the generated embedding information,
   said digital watermark detector generates said tracking information uniquely determined from said identification information for verification use, by encryption using the same secret key used in said digital watermark embedder, and detects said digital watermark in said digital content to be verified, based on the generated tracking information, and said verifier further comprises:
   a decoder which decodes said tracking information generated by encryption by said digital watermark detector using a public key which is a pair to said secret key used in said digital watermark detector;
   and a collator which collates information obtained by decoding by said decoder, with said identification information for verification use.

2. The digital content management system according to claim 1,
   wherein said verifier further comprises a first decision unit which determines said identification information for verification use as valid, when said collator shows agreement between said information obtained by decoding and said identification information for verification use.

3. The digital content management system according to claim 1,
   wherein said verifier further comprises a second decision unit which determines said identification information for verification use as invalid, when said collator shows disagreement between said information obtained by decoding and said identification information for verification use.

4. The digital content management system according to claim 1,
   wherein said digital watermark embedder generates a file which has a file name uniquely determined based on said identification information for tracking use, and embeds said file as said digital watermark into said digital content to be managed, and
   said digital watermark detector generates said file name uniquely determined based on said identification information for verification use, and detects the generated file name in said digital content to be verified.

5. The digital content management system according to claim 4,
   wherein said digital watermark embedder embeds, as said digital watermark, said file having the generated file name at a predetermined location of said digital content to be managed, and
   said digital watermark detector detects said file having the generated file name which resides at said predetermined location of said digital content to be verified.

6. The digital content management system according to claim 4, wherein said digital watermark embedder embeds, as said digital watermark, said file having the generated file name at the specified embedding location, and said digital watermark detector detects, in said digital content to be verified, said file having the generated file name which resides at the specified search location.

7. The digital content management system according to claim 4,
   wherein said digital watermark embedder generates a plurality of files having said file names, and respectively embeds them into said digital content to be managed, and
   said digital watermark detector detects at least one of said plurality of files having said plurality of file names, to be used as said digital watermark, in said digital content to be verified.

8. The digital content management system according to claim 4, further comprising:
   a digital content-to-be-managed detection unit which detects said digital content to be verified, in which said file name used as said digital watermark is detected by said digital watermark detector, as said digital content to be managed.

9. The digital content management system according to claim 1, wherein said digital watermark embedder comprises:
   an identification information-for-tracking-use accepting unit which accepts said identification information for tracking use;
   an assigning unit which detects file names of files, or file names containing directory names in said digital content to be managed, and assigns content layout identification information to each of the detected file names;
   an embedding location specifying unit which specifies an embedding location uniquely determined based on the accepted identification information for tracking use, by collating them with said content layout identification information; and
   an file name-to-be-embedded generation unit which generates an file name to be embedded by adding information uniquely determined based on the accepted identification information for tracking use to said file name which resides at the specified embedding location, said digital watermark embedder generates a file having said file name to be embedded which is generated by said file name-to-be-embedded generating unit, and embeds, based on said content layout identification information, the generated file as said digital watermark into said digital content to be managed.

10. The digital content management system according to claim 9, wherein said digital watermark detector comprises:
an identification information-for-verification-use accepting unit which accepts said identification information for verification use;
an assigning unit which detects file names of files, or file names containing directory names in said digital content to be verified, and assigns content layout identification information to each of the detected file names;
a search location specifying unit which specifies a search location uniquely determined based on the accepted identification information for verification use, by collating them with said content layout identification information; and
a search file name generating unit which generates, as a search file name, at least a part of said file name which resides at the specified search location,
said digital watermark detector detects a file having at least a part of said search file name in said digital content to be verified.

11. The digital content management system according to claim 10, wherein said digital watermark detector comprises:
an extraction unit which extracts said information from said predetermined location at which said file name of the detected file resides;
a collating unit which collates said information extracted by said extraction unit, with information uniquely determined based on said identification information for verification use accepted by said identification information-for-verification-use accepting unit; and
an identification information identifying unit which identifies said identification information for verification use, when said collator shows agreement between the extracted information, and information uniquely determined based on the accepted identification information for verification use accepted by said identification information for verification use accepting unit.

12. The digital content management system according to claim 1, wherein said digital watermark detector determines, as a target to be verified, a digital content remained after removal of a file or a directory created after the time said digital content to be managed is created.

13. The digital content management system according to claim 1, wherein said digital watermark detector compares said digital content to be managed and said digital content to be verified, and determines a file or a directory-containing file in said digital content to be managed, as a target to be verified, when a difference is found between said digital content to be verified and said digital content to be managed.

14. The digital content management system according to claim 1, wherein said digital content contains a file set.

15. The digital content management system according to claim 1, wherein said digital content is a virtual machine image file.

16. The digital content management system according to claim 1, wherein said digital watermark embedding unit assumes a plurality of digital contents as the target to be managed, and embeds said digital watermark into each of said digital contents to be managed.

* * * * *